United States Patent
Hahn et al.

(10) Patent No.: US 10,425,884 B2
(45) Date of Patent: Sep. 24, 2019

(54) METHOD FOR SETTING UP BEARER IN WIRELESS COMMUNICATION SYSTEM AND APPARATUS SUPPORTING SAME

(71) Applicant: LG ELECTRONICS INC., Seoul (KR)

(72) Inventors: Genebeck Hahn, Seoul (KR); Heejeong Cho, Seoul (KR); Eunjong Lee, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 15/759,778

(22) PCT Filed: Sep. 14, 2015

(86) PCT No.: PCT/KR2015/009613
§ 371 (c)(1),
(2) Date: Mar. 13, 2018

(87) PCT Pub. No.: WO2017/047831
PCT Pub. Date: Mar. 23, 2017

(65) Prior Publication Data
US 2019/0053135 A1  Feb. 14, 2019

(51) Int. Cl.
*H04W 48/16* (2009.01)
*H04W 24/10* (2009.01)
(Continued)

(52) U.S. Cl.
CPC ....... *H04W 48/16* (2013.01); *H04W 72/1226* (2013.01); *H04W 76/10* (2018.02);
(Continued)

(58) Field of Classification Search
None
See application file for complete search history.

(56) References Cited

U.S. PATENT DOCUMENTS

| | | | |
|---|---|---|---|
| 2011/0090873 A1* | 4/2011 | Lee | H04W 36/0066 370/332 |
| 2013/0016696 A1* | 1/2013 | Adjakple | H04W 28/0252 370/331 |

(Continued)

FOREIGN PATENT DOCUMENTS

WO    2014/060036 A1    4/2014

OTHER PUBLICATIONS

LG Electronics Inc., "Consideration on SIPTO for DC: Standalone Case", R3-151355, 3GPP TSG-RAN WG3 Meeting #89, Beijing, China, Aug. 24-28, 2015, see pp. 1, 2.
(Continued)

*Primary Examiner* — Candal Elpenord
(74) *Attorney, Agent, or Firm* — Dentons US LLP

(57) ABSTRACT

The present specification relates to a method for setting up a bearer in a wireless communication system, carried out by a first base station, comprising the steps of: receiving, from a network entity, a first message requesting to set up an E-UTRAN radio access bearer (E-RAB) for a mission critical service (MCS); transmitting, to the at least one second base station, a second message requesting to set up an alternative link with the terminal, based on the received first message; and receiving, from the at least one second base station, a response message to the second message.

20 Claims, 27 Drawing Sheets

(51) Int. Cl.
    H04W 76/30    (2018.01)
    H04W 88/08    (2009.01)
    H04W 72/12    (2009.01)
    H04W 76/11    (2018.01)
    H04W 76/10    (2018.01)
    H04W 76/15    (2018.01)
(52) U.S. Cl.
    CPC ............ *H04W 76/11* (2018.02); *H04W 76/15* (2018.02); *H04W 76/30* (2018.02); *H04W 88/08* (2013.01); *H04W 24/10* (2013.01); *H04W 72/1236* (2013.01)

(56) References Cited

U.S. PATENT DOCUMENTS

| | | | |
|---|---|---|---|
| 2013/0148597 A1 | 6/2013 | Lee et al. | |
| 2013/0170347 A1* | 7/2013 | Zhang | H04W 4/70 370/230 |
| 2014/0286218 A1 | 9/2014 | Park et al. | |
| 2016/0219475 A1* | 7/2016 | Kim | H04L 5/00 |
| 2016/0295385 A1* | 10/2016 | Wang | H04W 4/90 |
| 2016/0373975 A1* | 12/2016 | Xu | H04W 36/0055 |

OTHER PUBLICATIONS

Nokia Networks, "Dual Connectivity enhancements with LIPA", R3-151361, 3GPP TSG-RAN WG3 Meeting #89, China, Aug. 24-28, 2015, see pp. 1, 2.

* cited by examiner

【Figure 1】
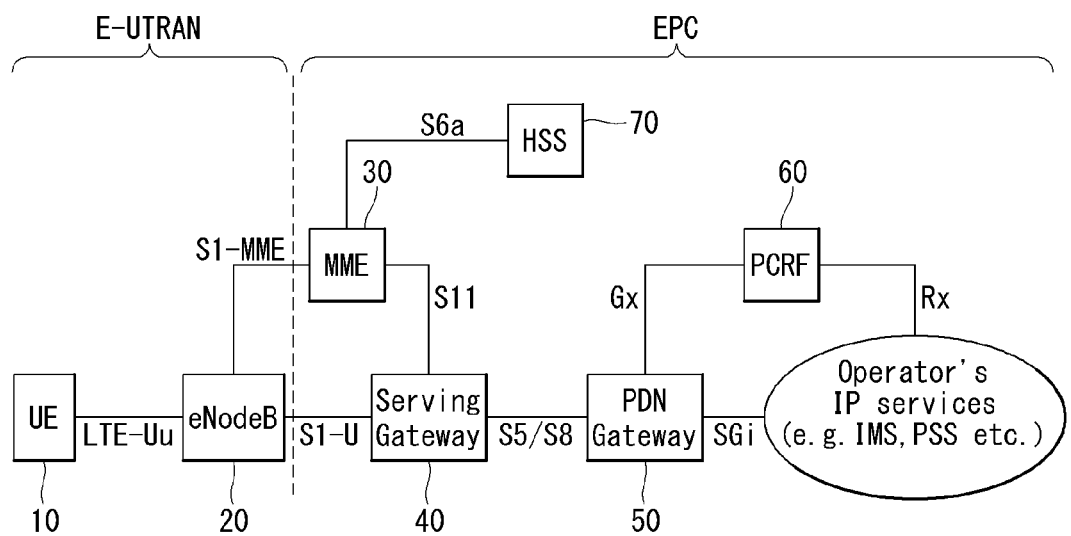

[Figure 2]
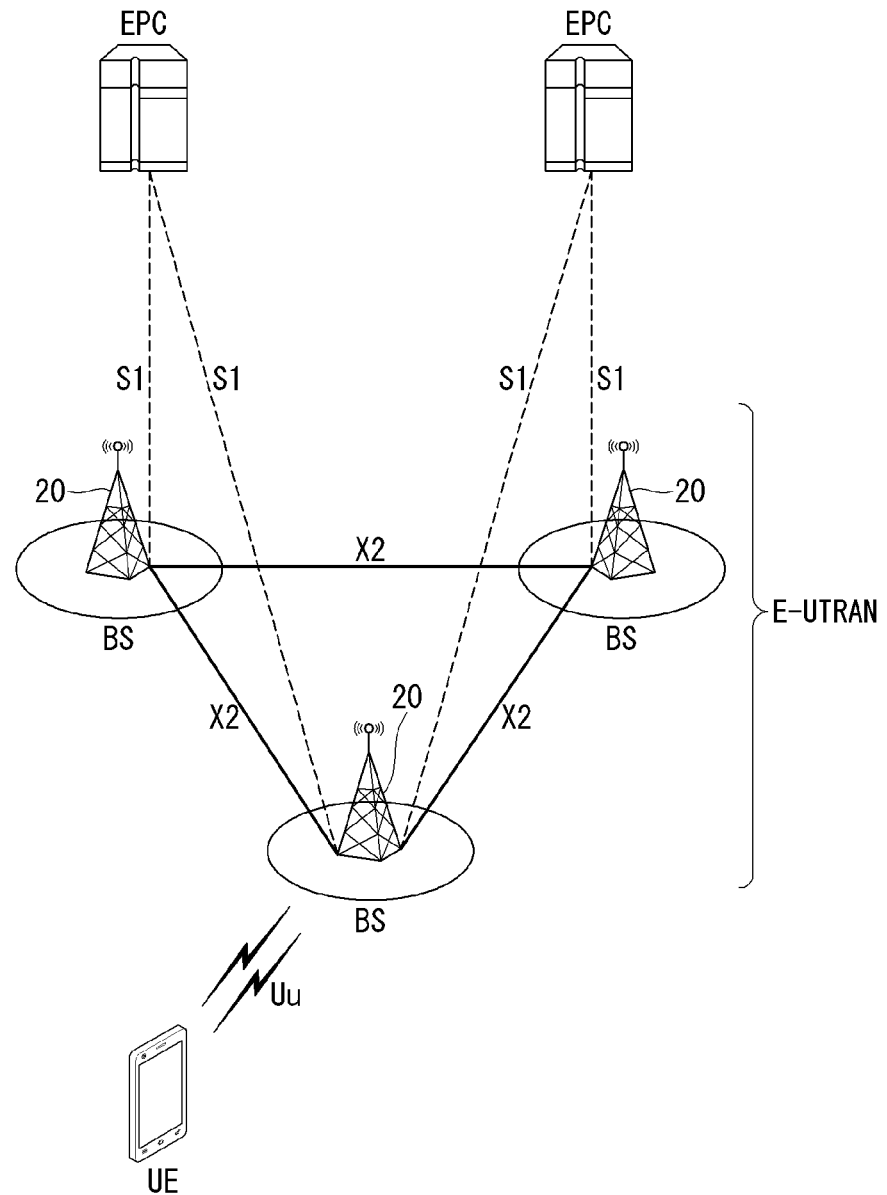

[Figure 3]
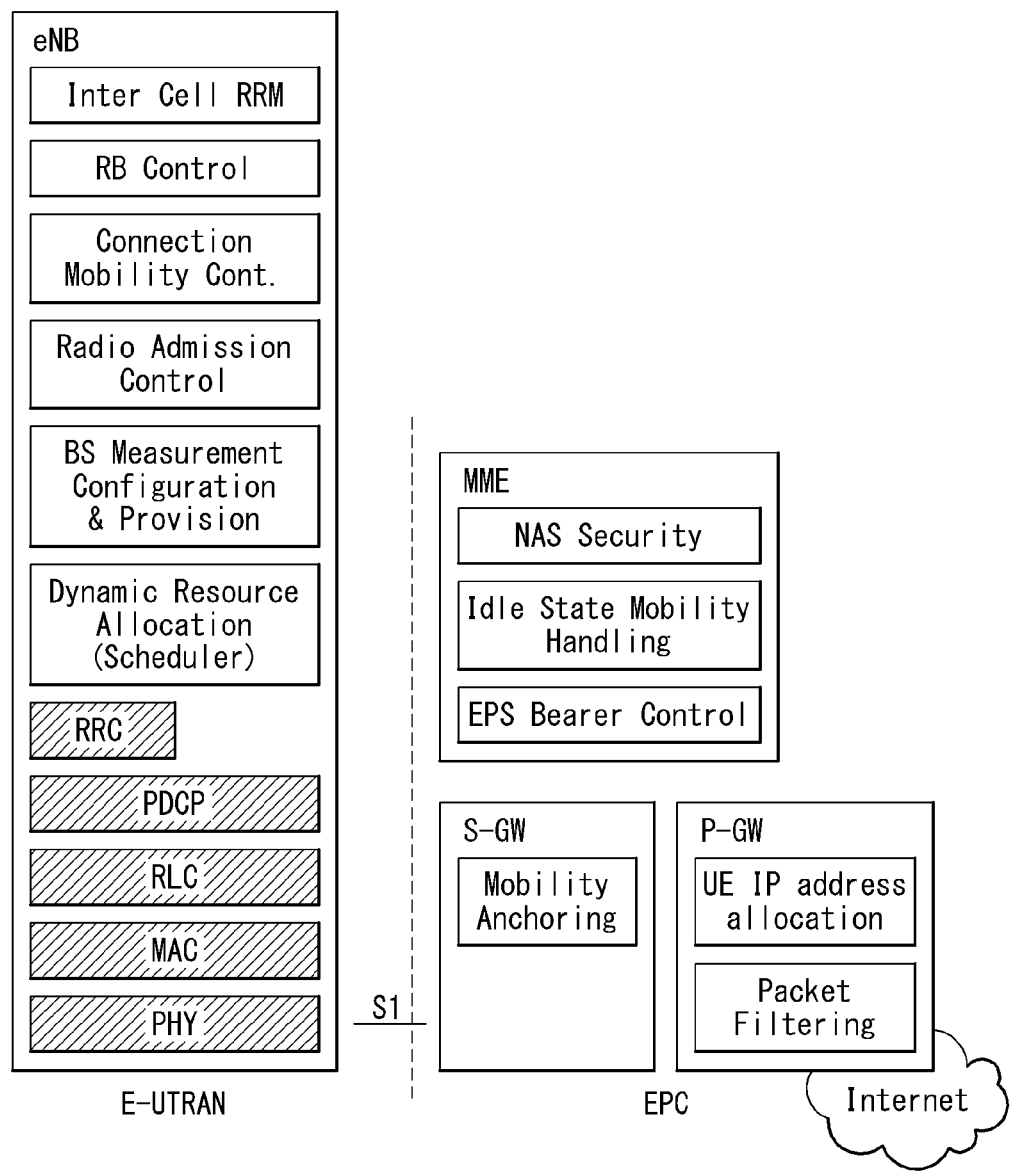

【Figure 4】
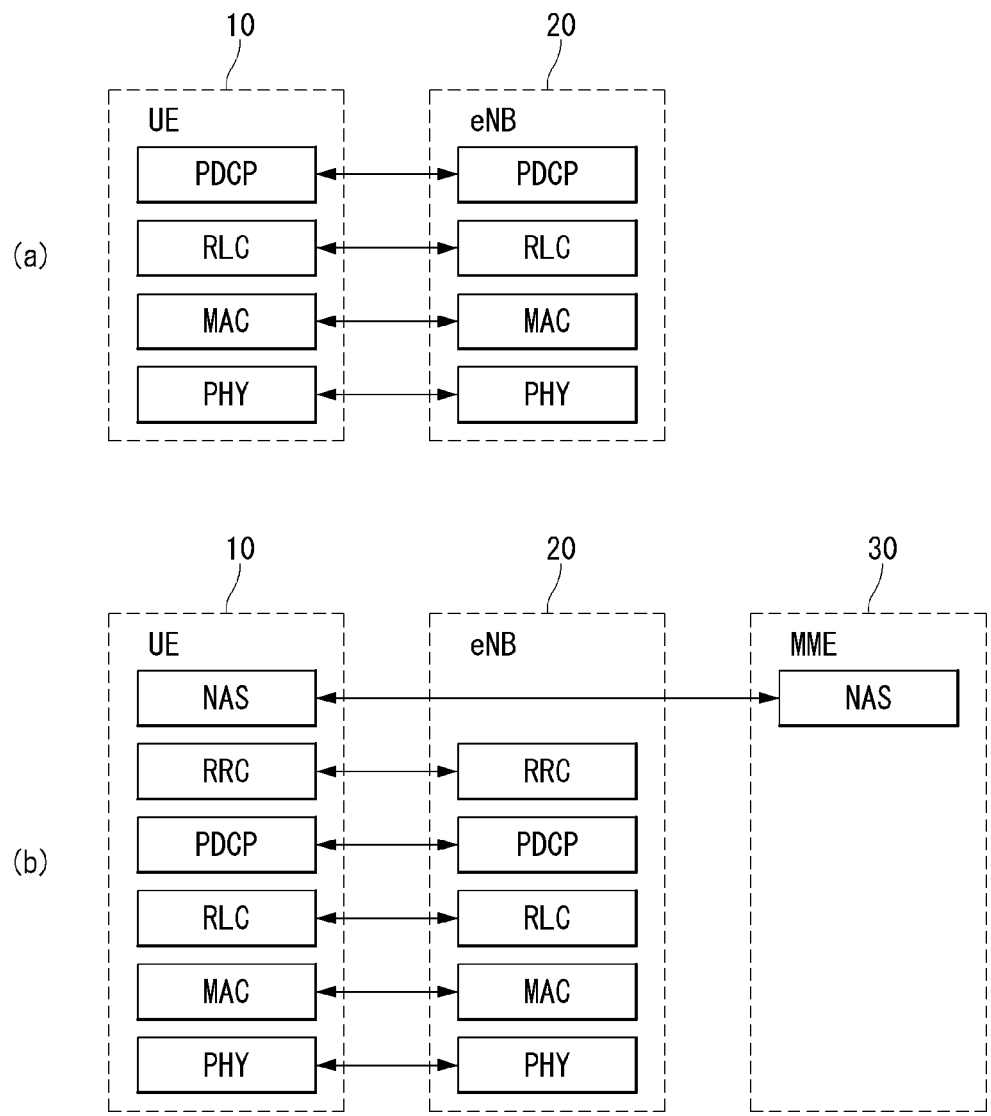

[Figure 5]
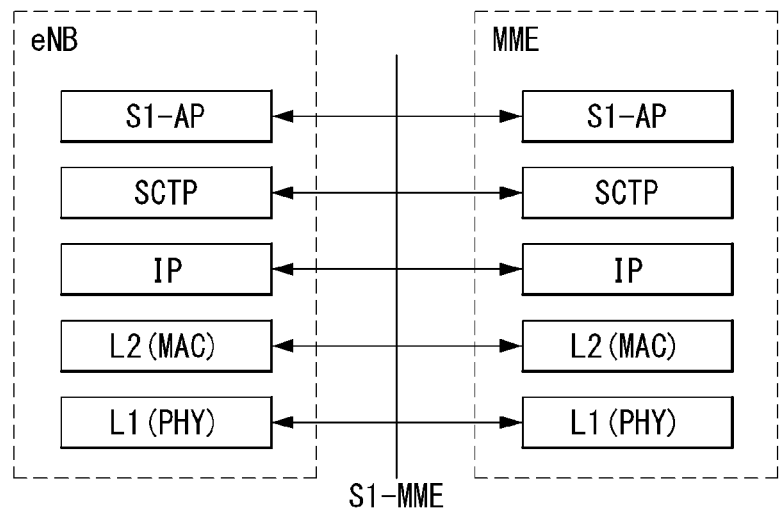
(a) control-plane protocol stack
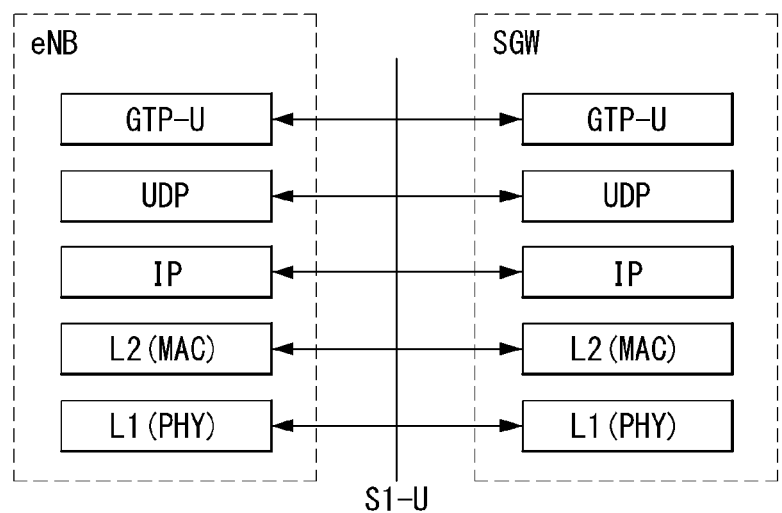
(b) user-plane protocol stack 【Figure 6】
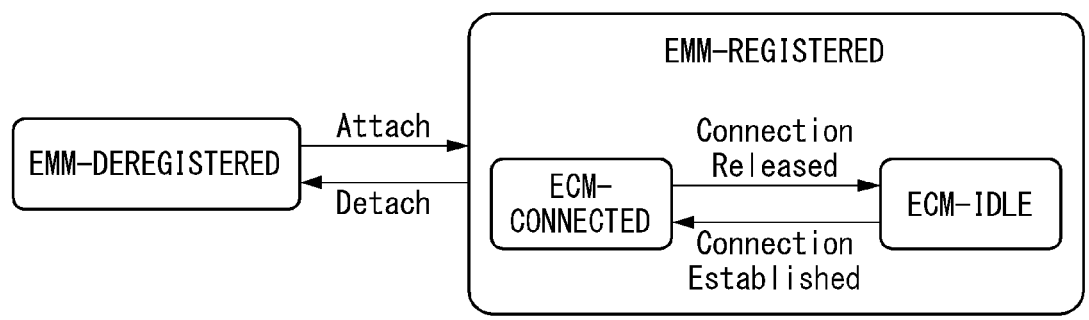

【Figure 7】
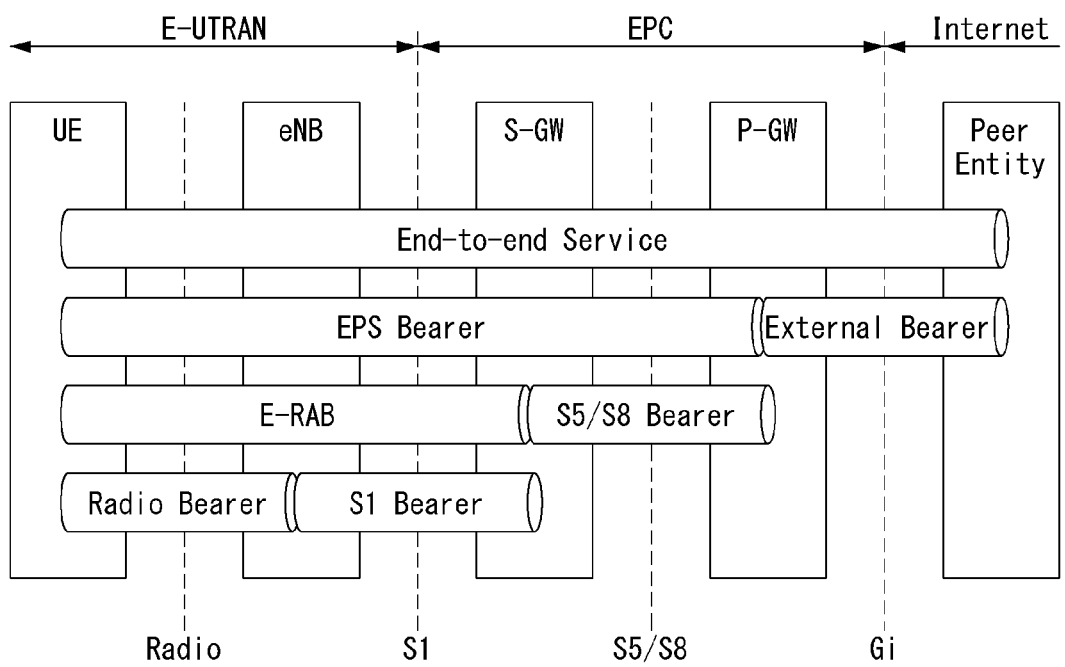

[Figure 8]
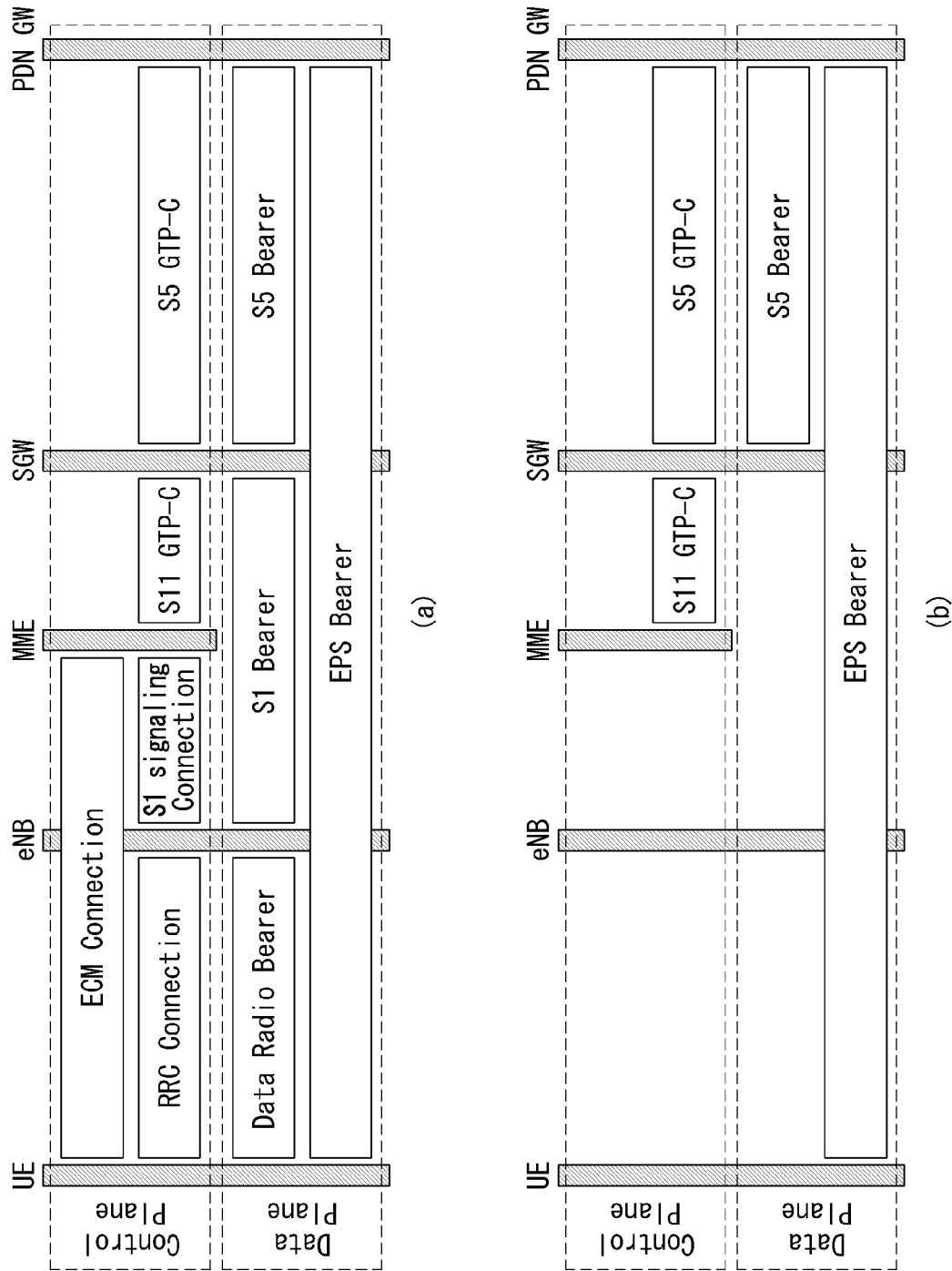

【Figure 9】
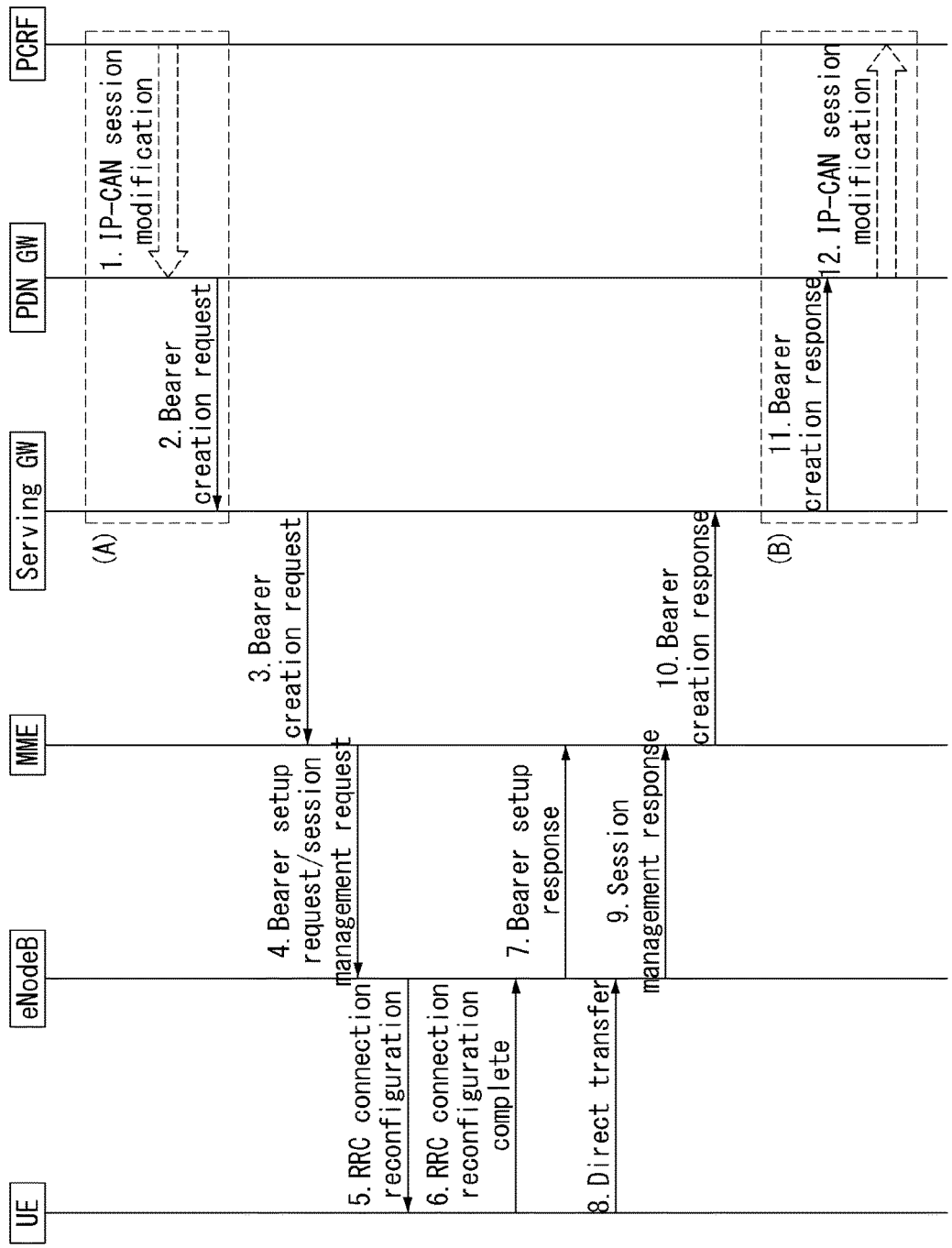

【Figure 10】
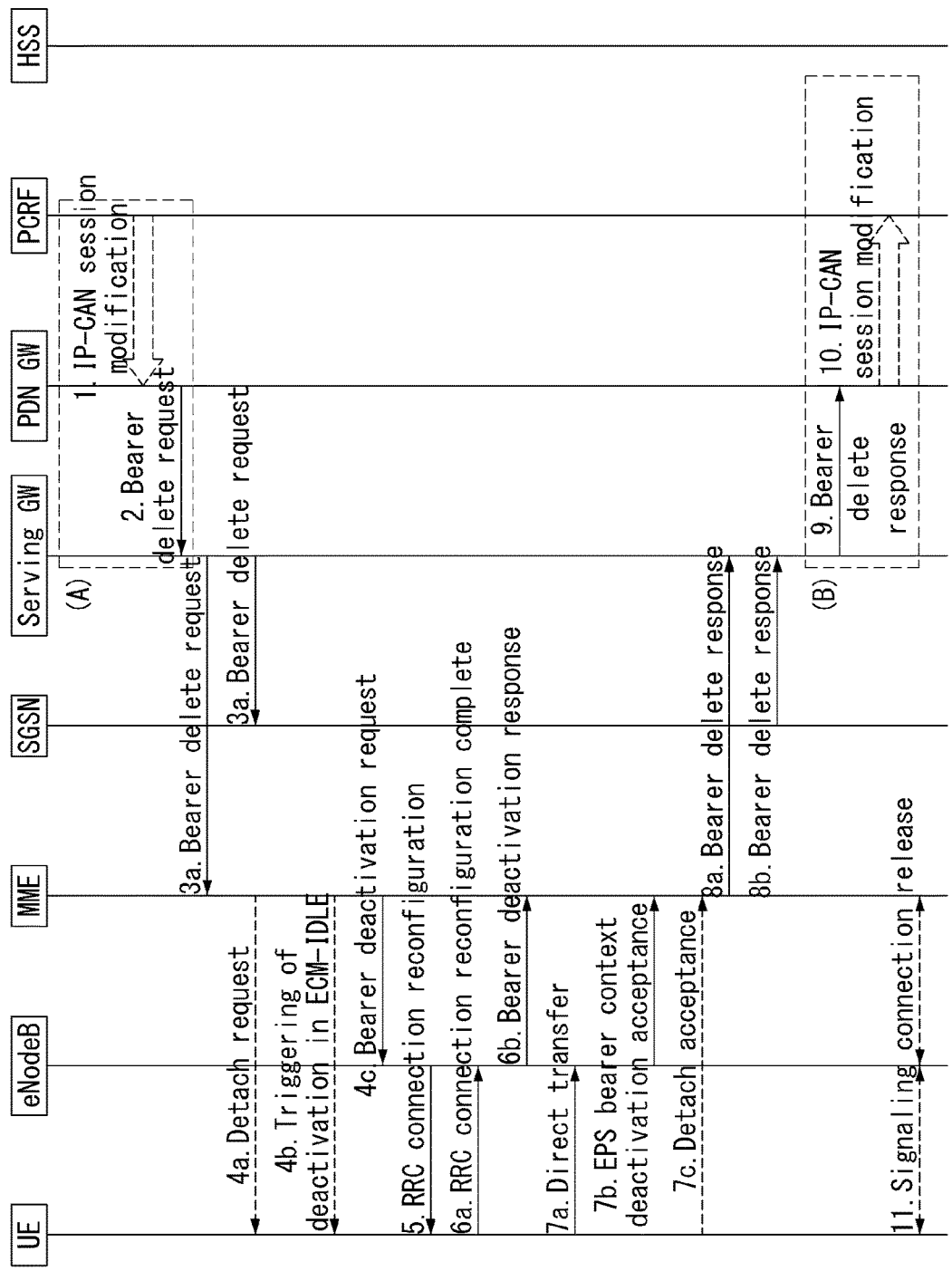

[Figure 11]
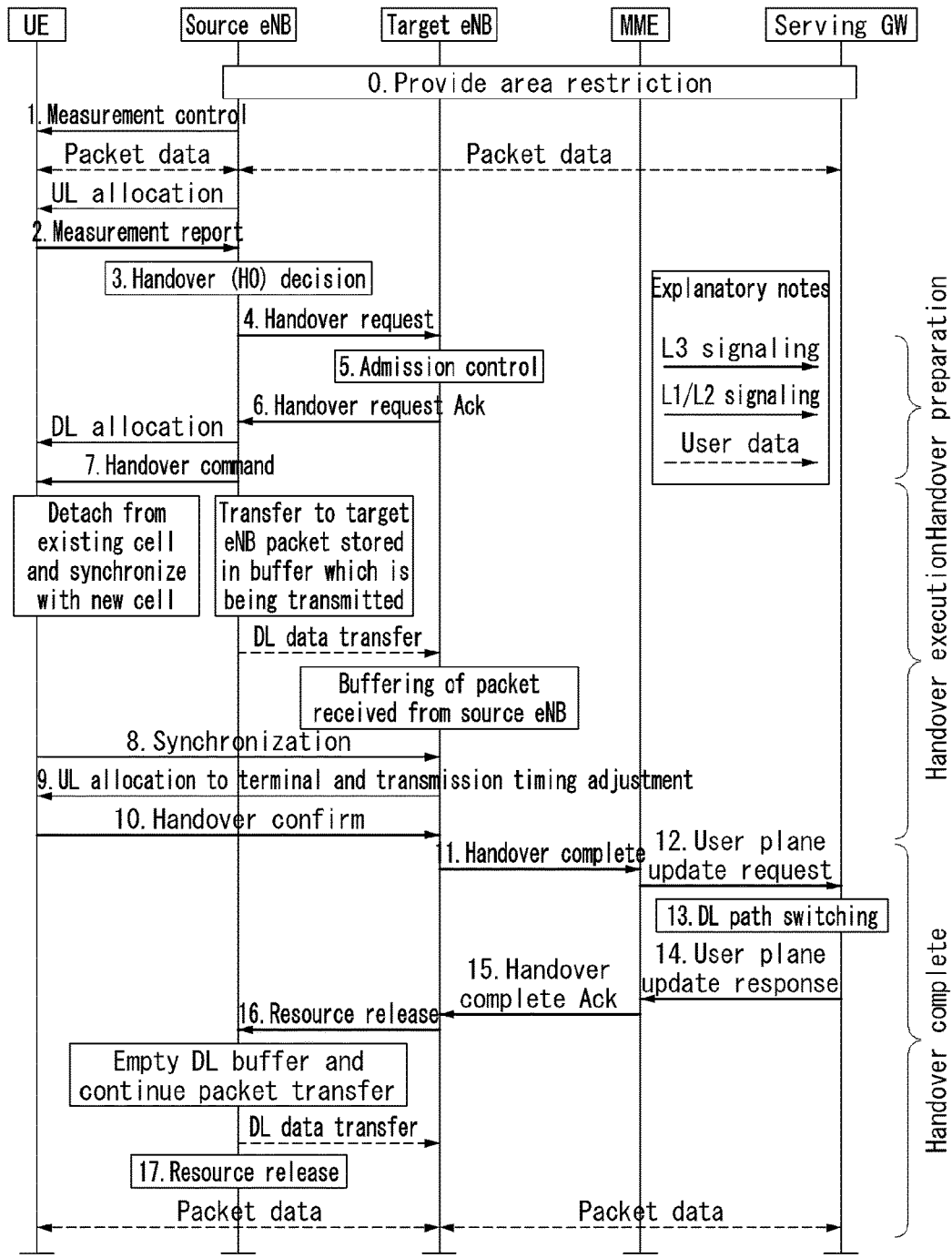

[Figure 12]
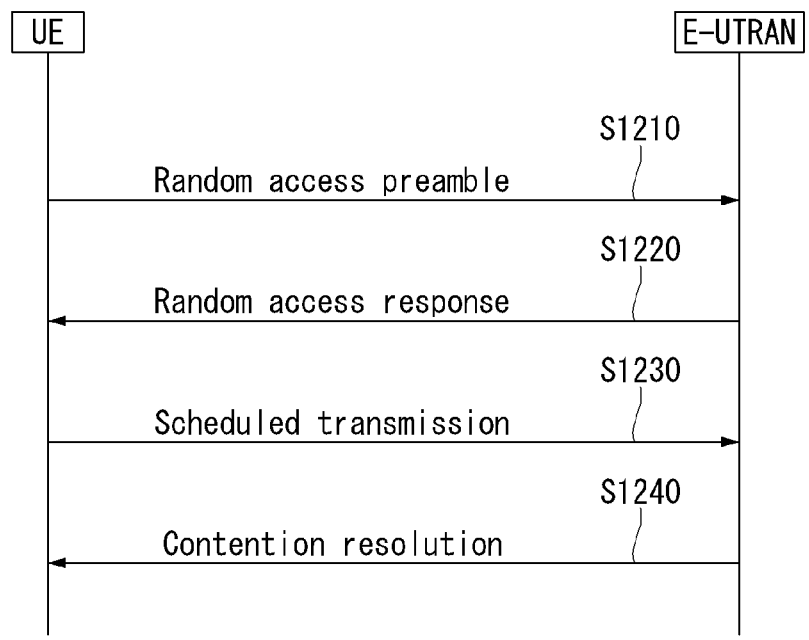

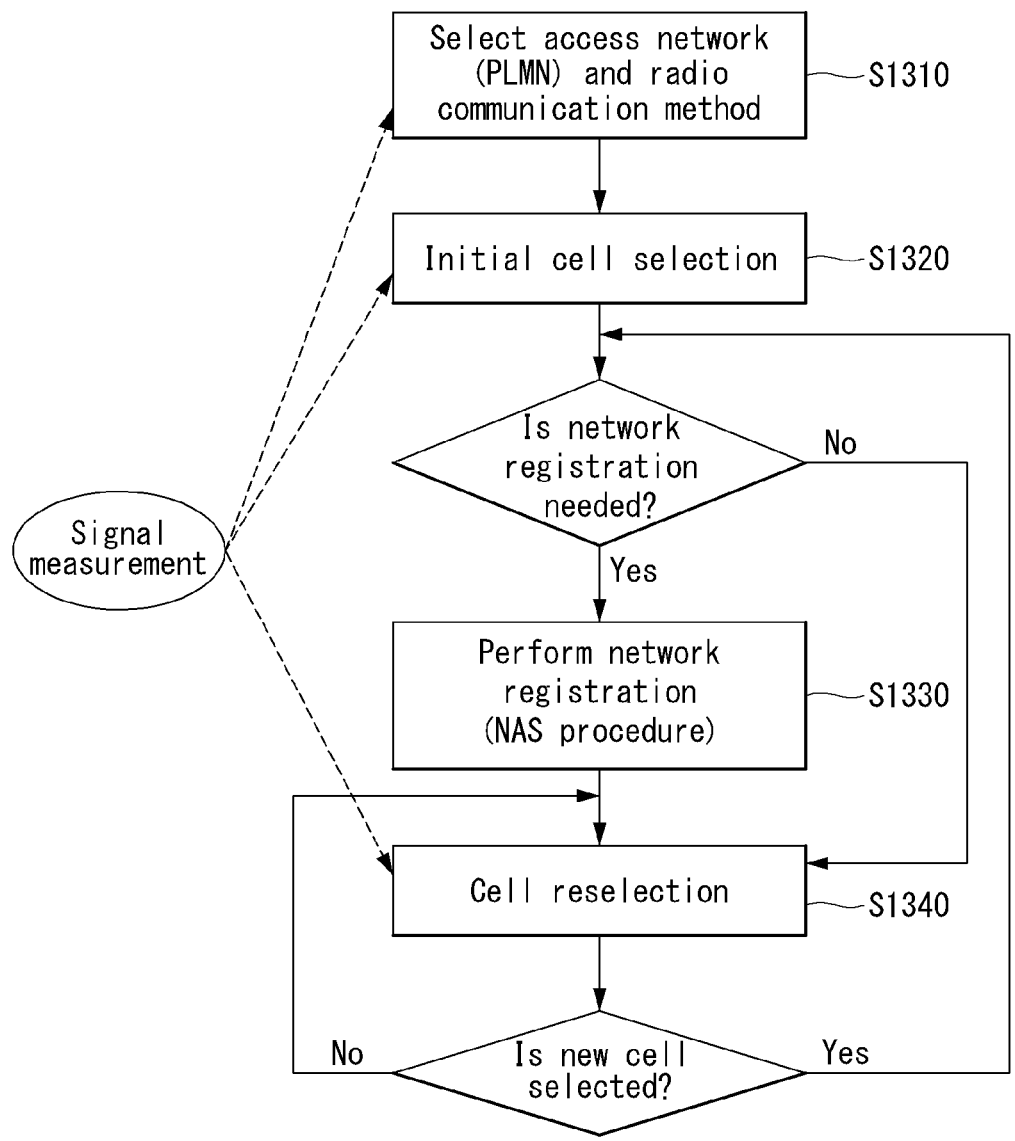
[Figure 13]

[Figure 14]
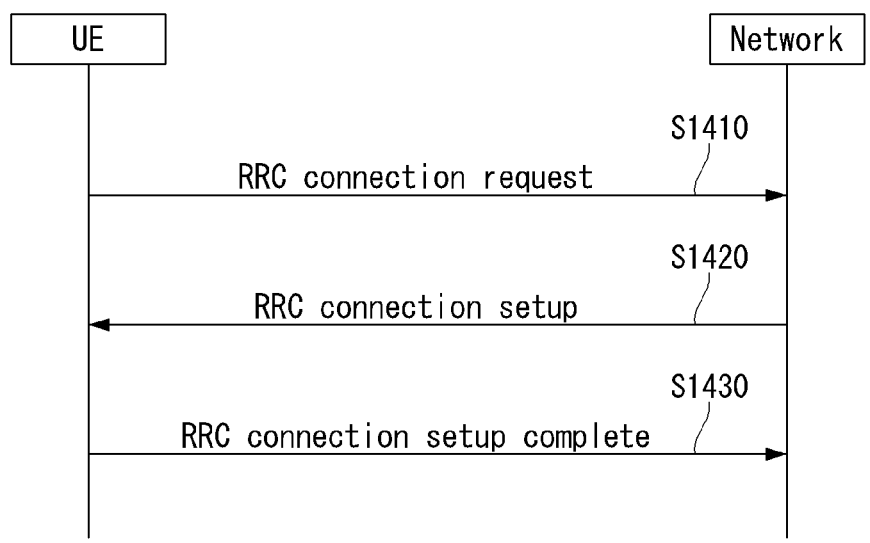

[Figure 15]
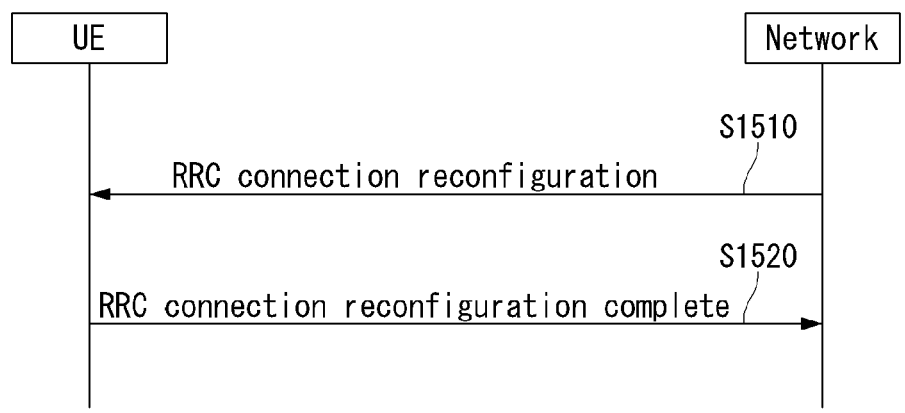

[Figure 16]
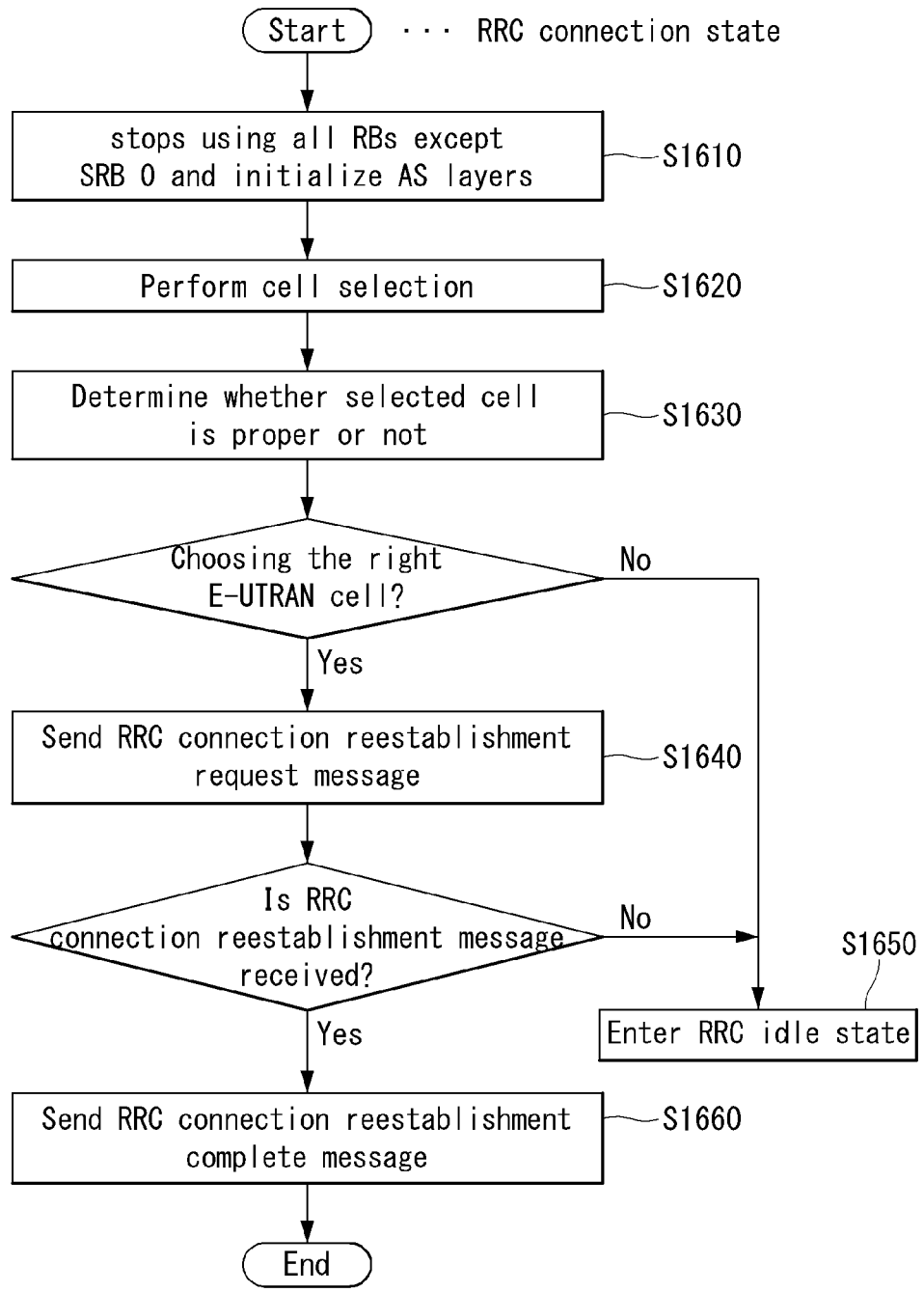

[Figure 17]
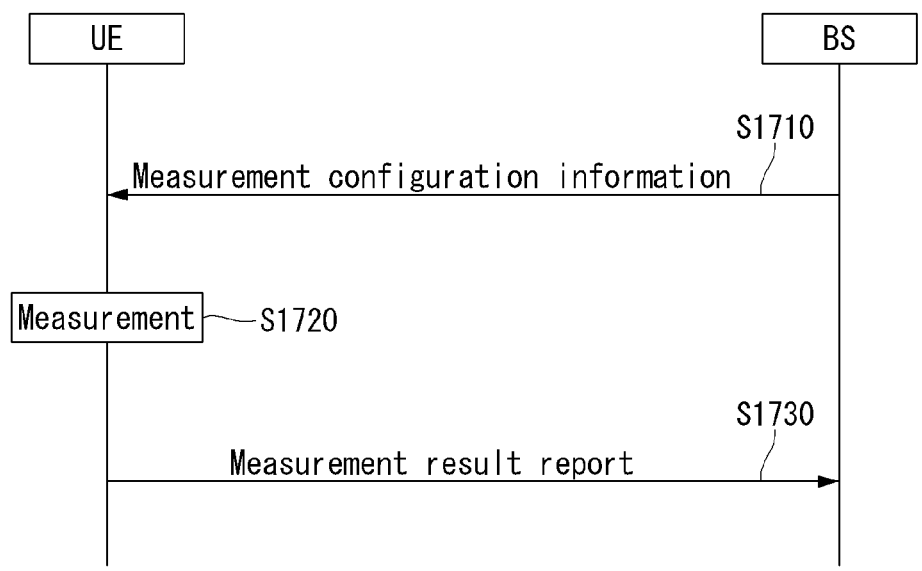

[Figure 18]
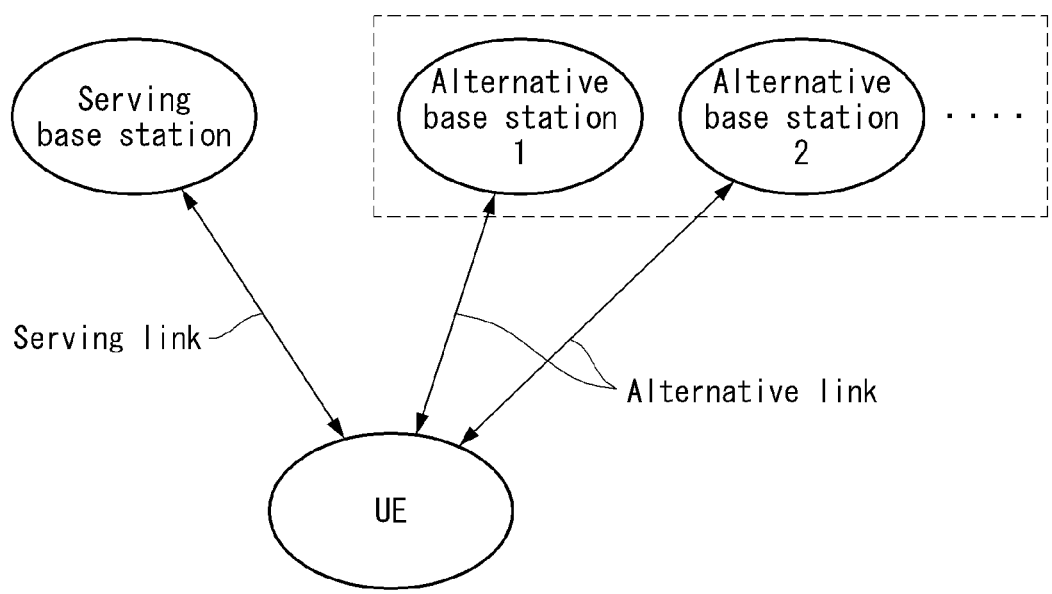

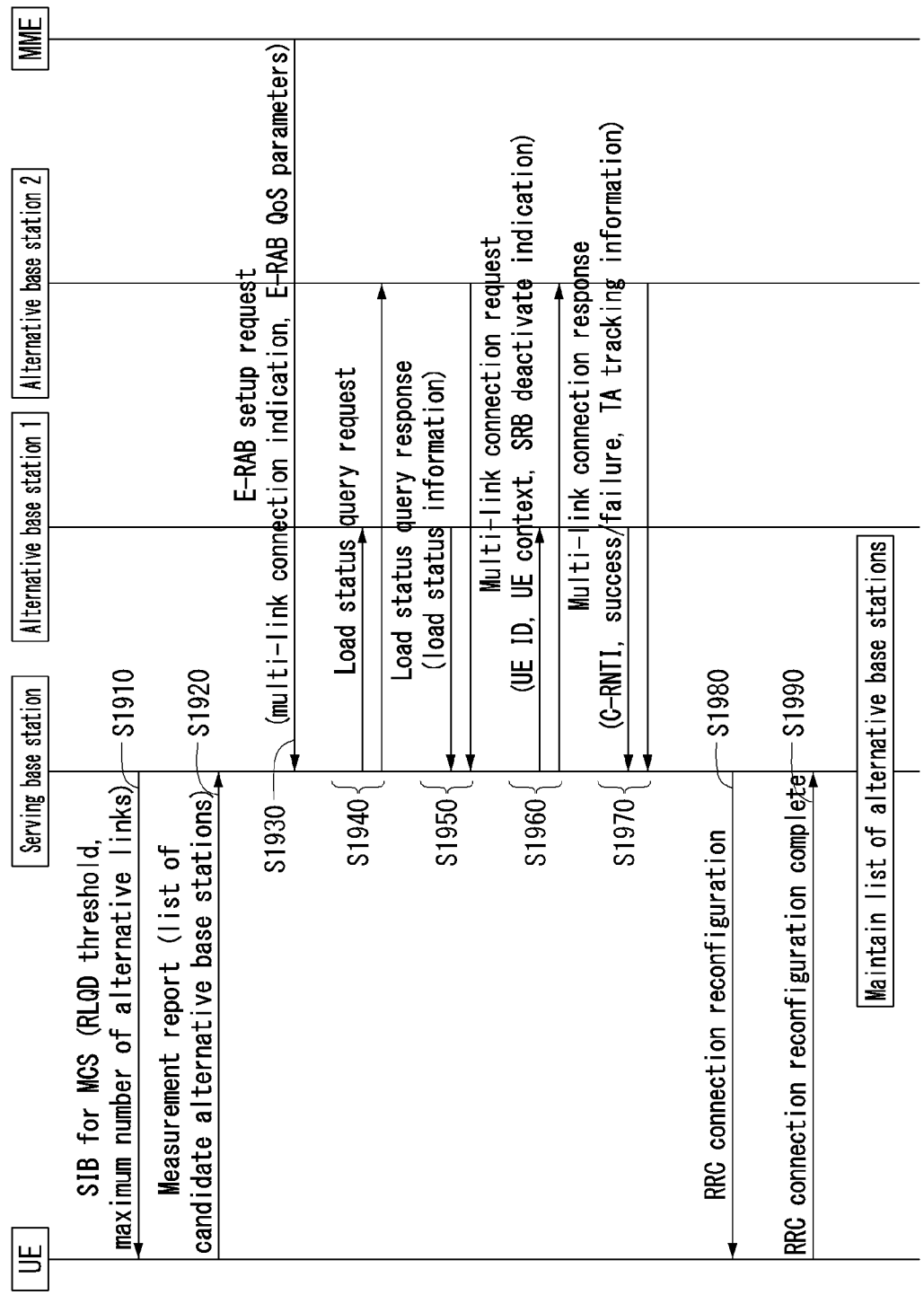
[Figure 19]

【Figure 20】
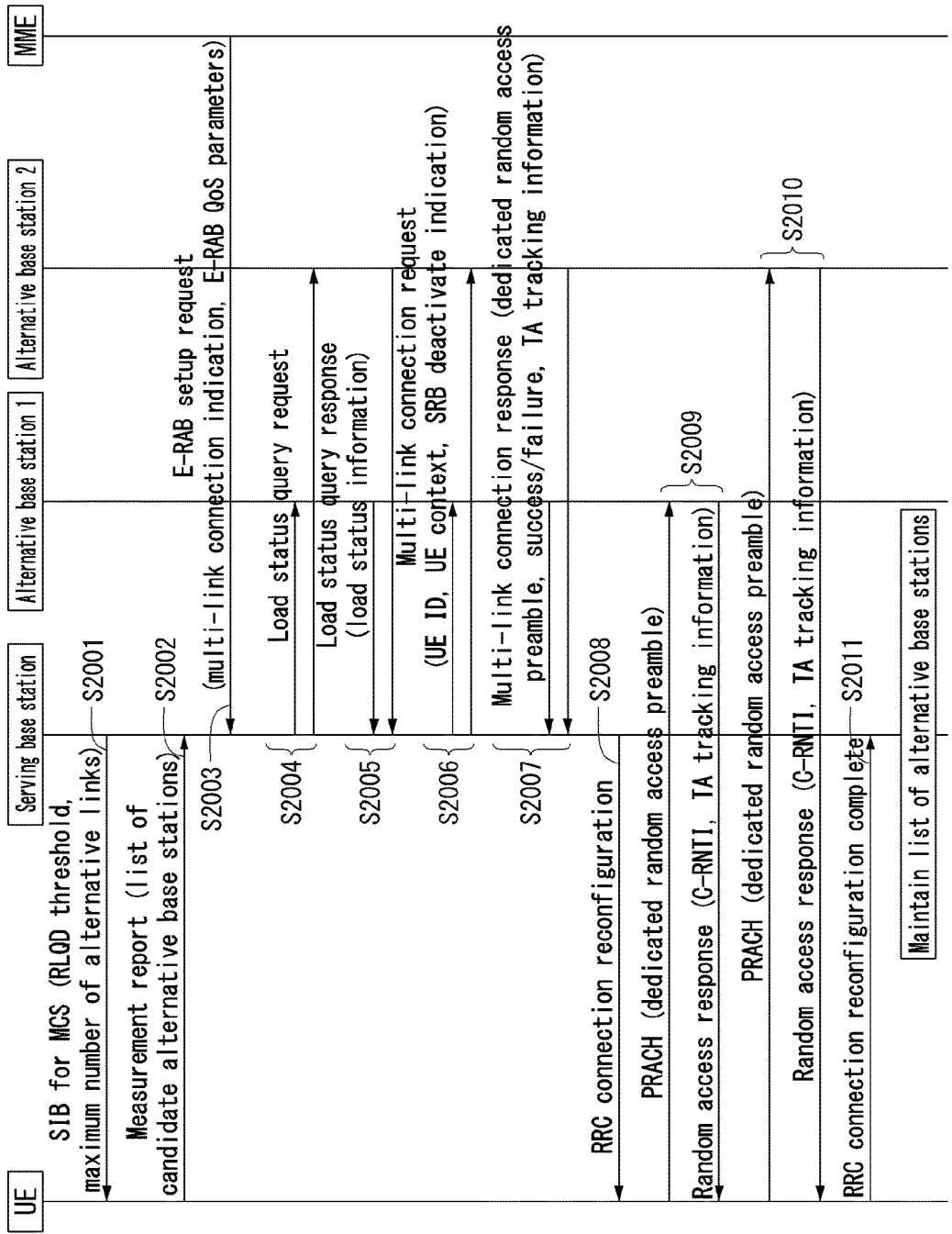

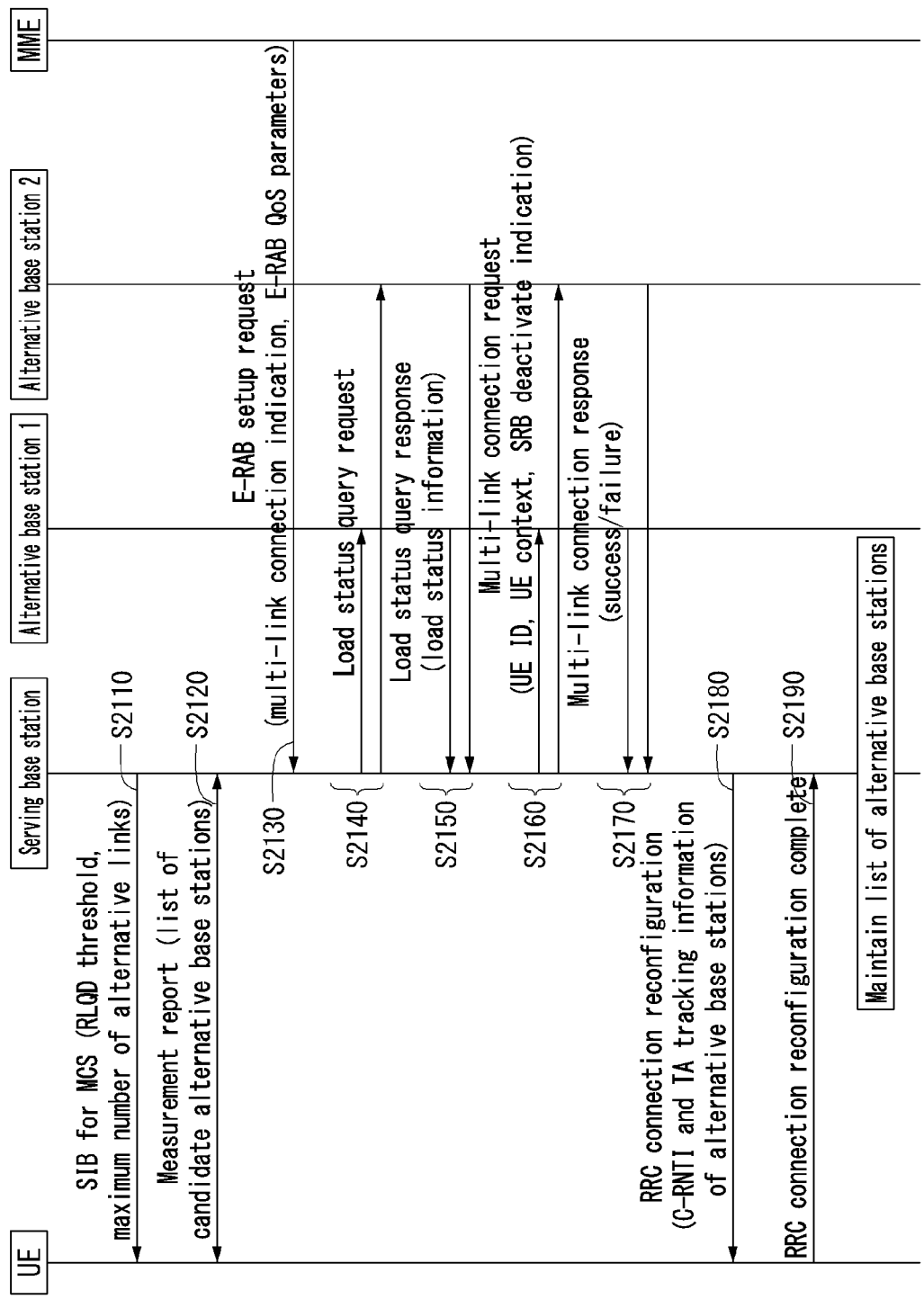
[Figure 21]

[Figure 22]
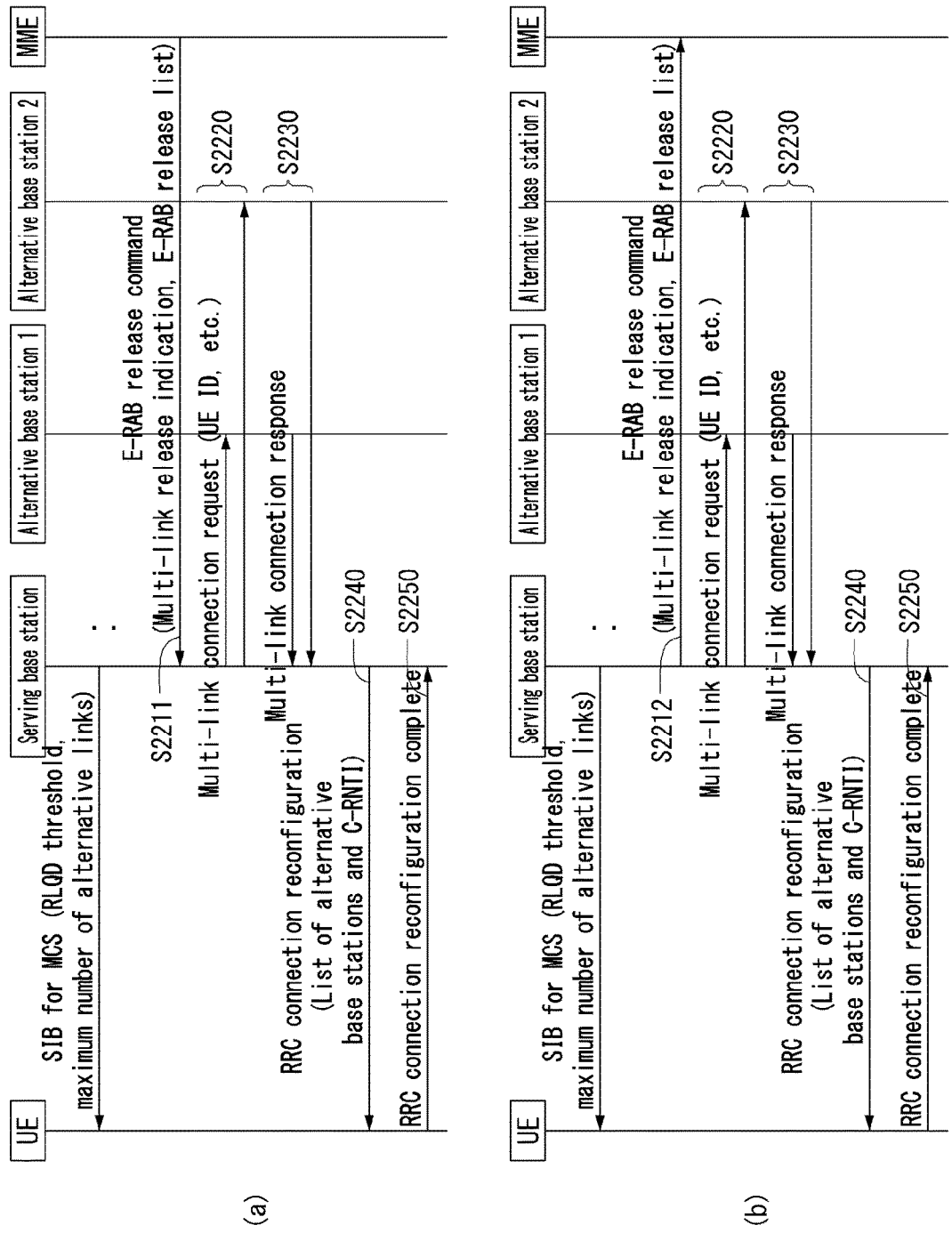

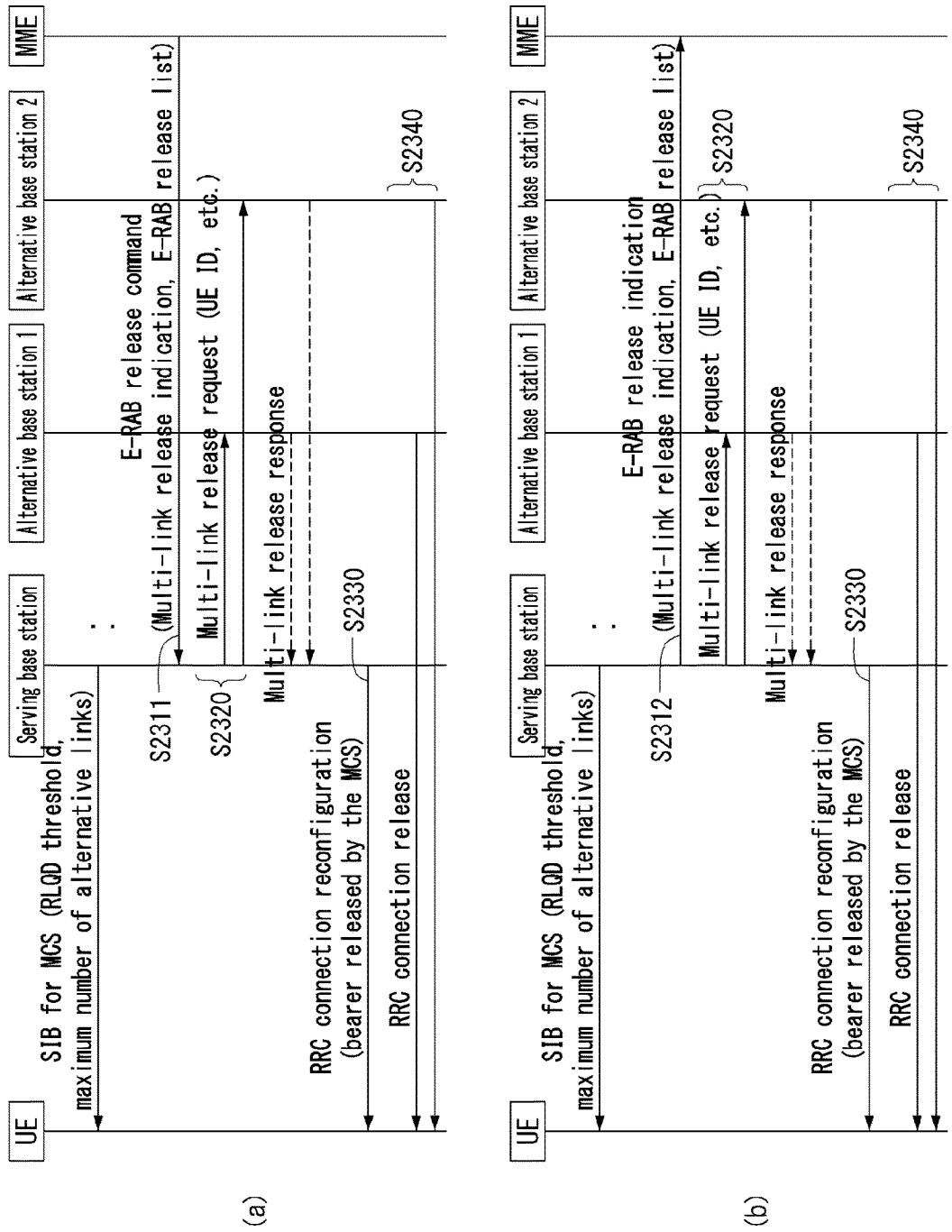
[Figure 23]

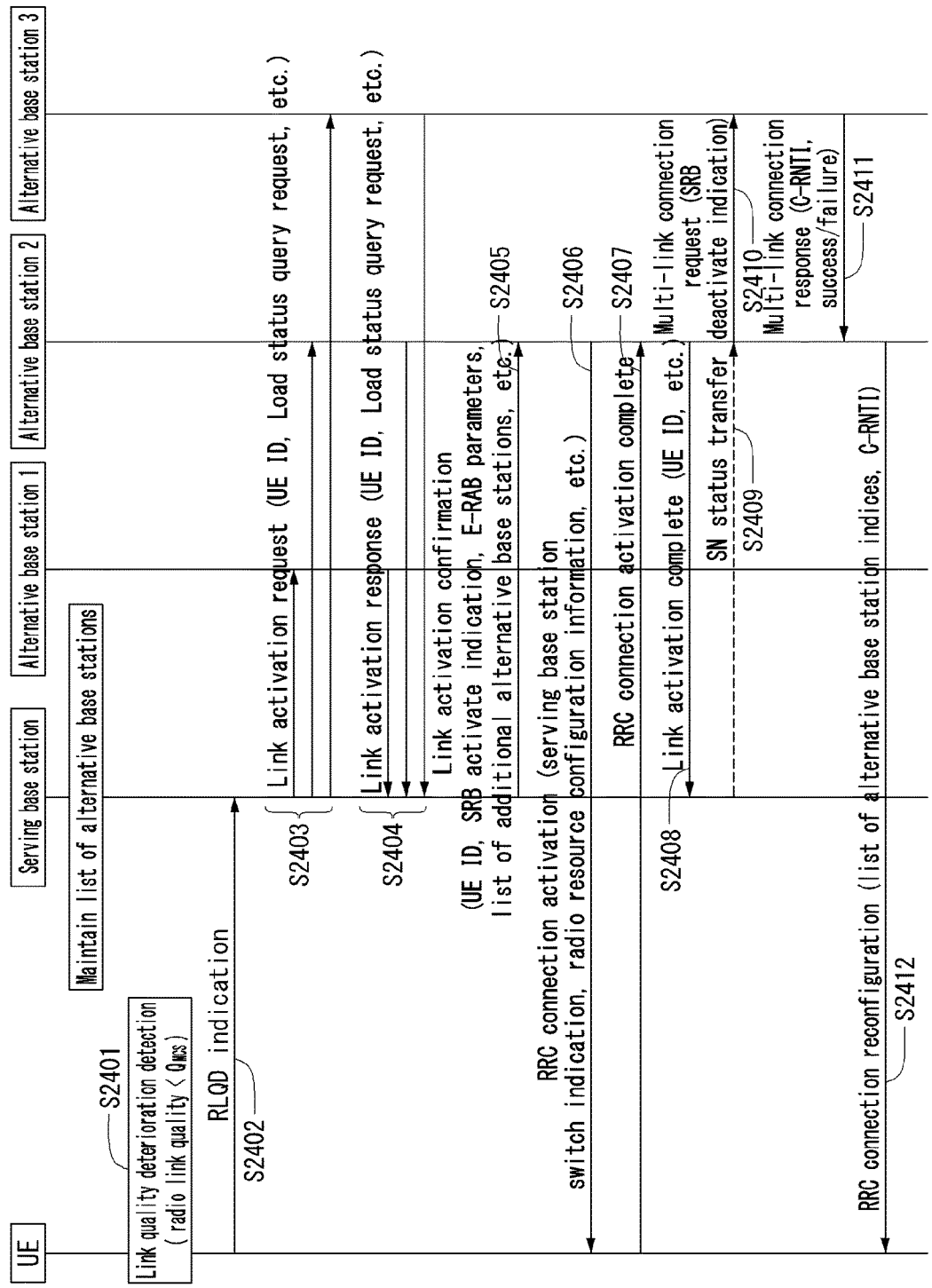
[Figure 24]

[Figure 25]
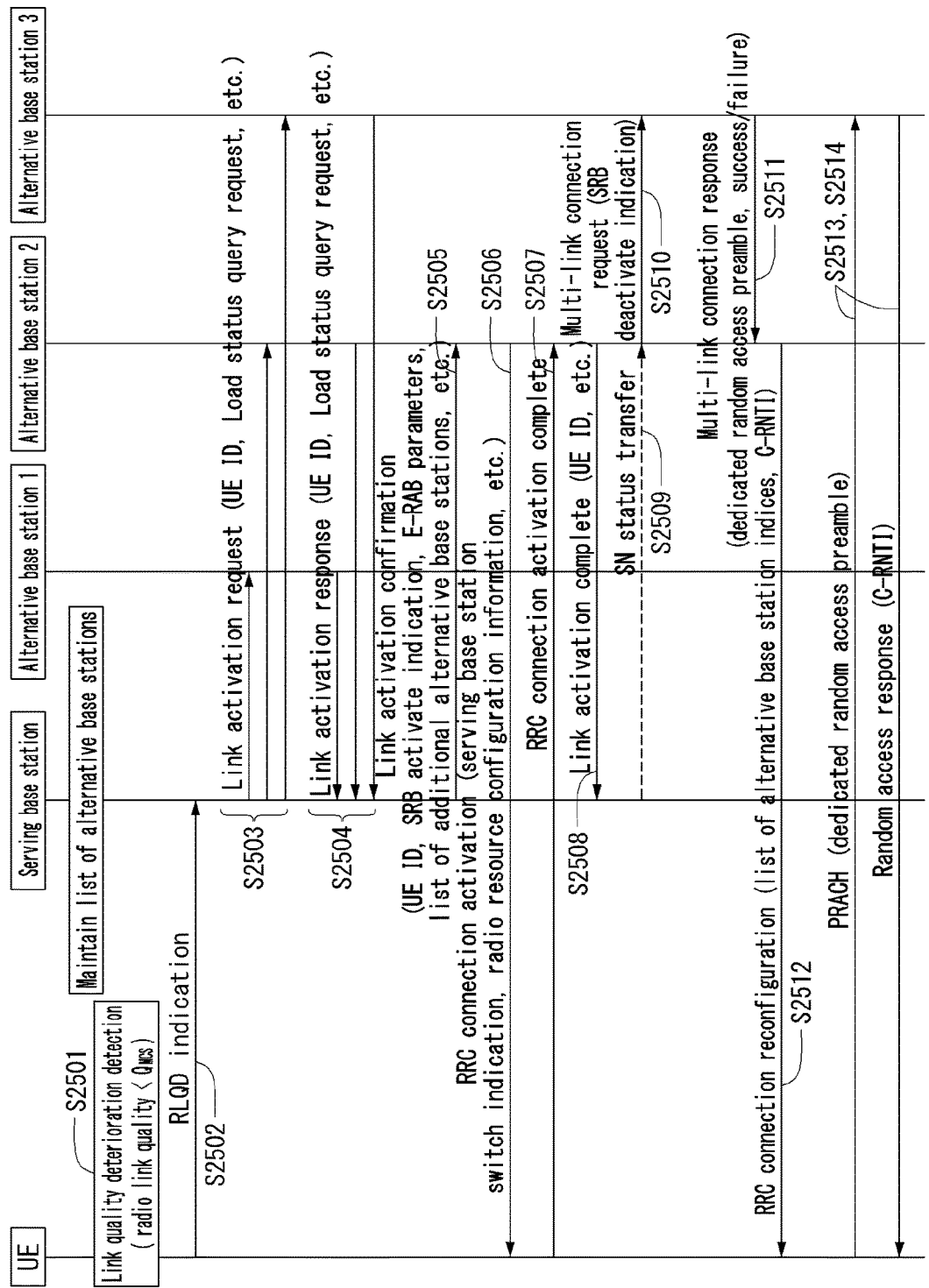

[Figure 26]
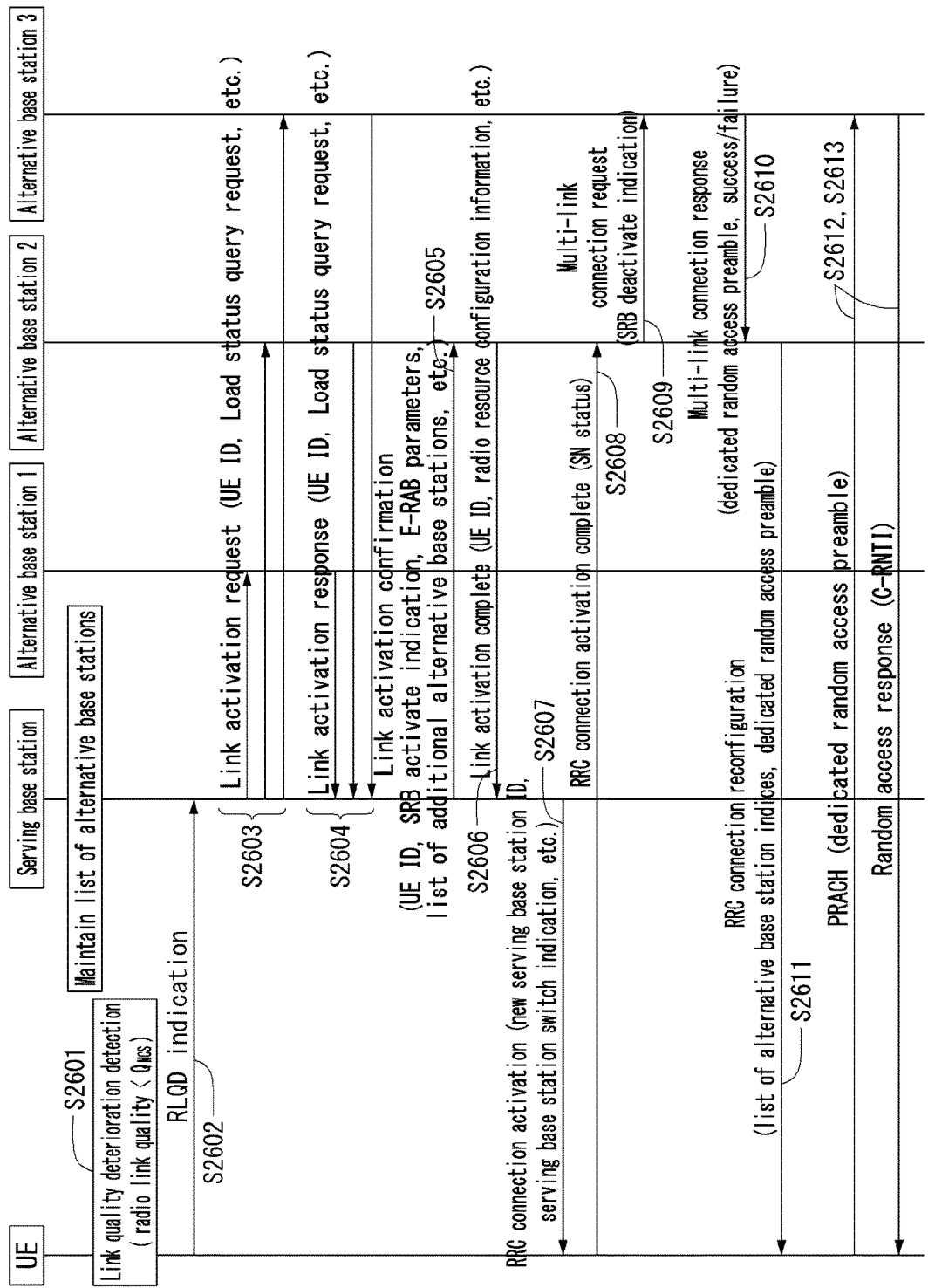

【Figure 27】
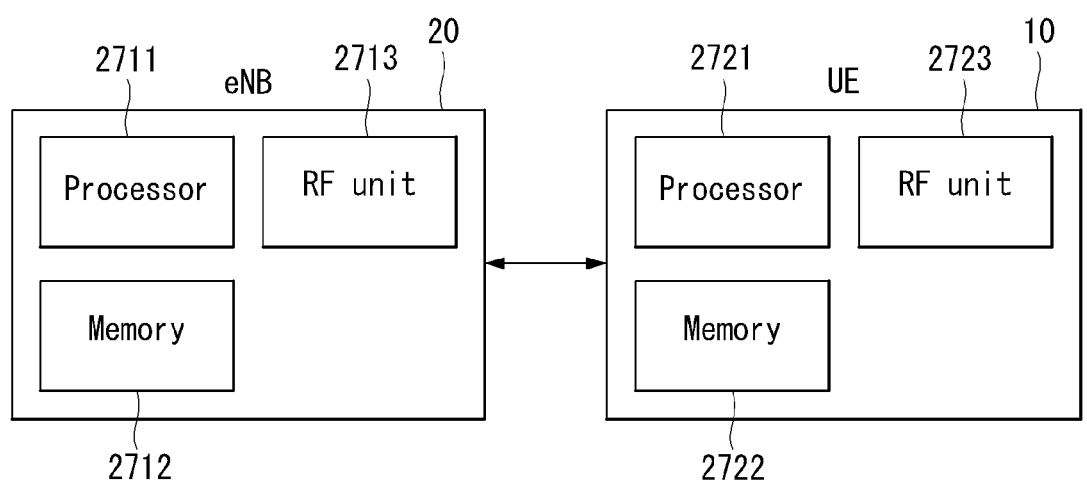

METHOD FOR SETTING UP BEARER IN WIRELESS COMMUNICATION SYSTEM AND APPARATUS SUPPORTING SAME

CROSS-REFERENCE TO RELATED APPLICATIONS

This application is the National Stage filing under 35 U.S.C. 371 of International Application No. PCT/KR2015/009613, filed on Sep. 14, 2015, the contents of which are all hereby incorporated by reference herein in their entirety.

TECHNICAL FIELD

The present specification relates to a method for setting up a bearer in a wireless communication system and an apparatus supporting the same.

BACKGROUND ART

Mobile communication systems have been developed to provide voice services while guaranteeing user mobility. Such mobile communication systems have expanded their coverage from voice services through data services up to high-speed data services. However, as current mobile communication systems suffer resource shortages and users demand even higher-speed services, the development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as dual connectivity, massive Multiple Input Multiple Output (MIMO), in-band full duplex, non-orthogonal multiple access (NOMA), supporting super-wide band, and device networking, have been researched.

DISCLOSURE

Technical Problem

Currently, the radio link availability of LTE/LTE-A systems entirely depends on network coverage rate, which is as high as approximately 95%.

Moreover, it is assumed that, as for the radio link reliability of LTE/LTE-A systems, sufficient reliability can be provided by H-ARQ retransmission since BER (Block Error Rate) is 10-1 in the case of unicast data through PDSCH without separating a control plane (C-Plane) and a user plane (U-Plane).

Despite the fact that LTE/LTE-A systems have currently become highly active and provide various services, they do not provide connectivity that always ensures reliability for mission critical services (MCSs) in in every time slot.

Since LTE/LTE-A systems are designed to deliver relatively good connectivity most of the time, they provide a data rate near '0' in a specific poor coverage area where there is too much interference or network resources are overloaded.

In the future, it is expected that new MCSs will emerge that largely depend on the availability/reliability of radio links to satisfy a high level of communication quality, and the advancement of wireless technology for embracing such new MCSs is needed.

Accordingly, an aspect of the present specification is to provide a method for shifting away from 'Best Effort Mobile Broadband' of current LTE/LTE-A systems towards 'Truly Reliable Communication" of 5G.

That is, an aspect of the present specification is to provide a method for establishing multiple connections with a plurality of base stations by a network (e.g., MME) indication, when setting up an MCS bearer for terminals receiving MCSs in a future 5G mobile communication system. This means that SRB Inactive RRC connections to a plurality of base stations are established.

Another aspect of the present specification is to provide a method in which the best alternative base station is selected from among secured alternative base stations when the radio link quality of a serving base station is degraded 1) to activate an RRC connection with the selected best alternative base station and 2) to set up an MCS bearer more quickly via an alternative link of the corresponding alternative base station.

Methods proposed in the present specification are methods for achieving flexible radio link connection control to improve a terminal's satisfaction with radio link quality for applications that meet low transmission delay requirements of less than 1 ms and require high reliability (packet error rate<10-6), when providing smart car safety services and remote control services for medical care, industry, and robots.

A terminal's searching for and maintaining an alternative base station, apart from radio links being used by it means providing support so that the terminal can always possess radio links that meet minimum QoE requirements for MCSs within a specific geographical area.

Technical problems to be solved by the present invention are not limited to the above-mentioned technical problems, and other technical problems not mentioned herein may be clearly understood by those skilled in the art from description below.

Technical Solution

An embodiment of the present specification provides a method for setting up a bearer in a wireless communication system, carried out by a first base station, comprising the steps of: receiving, from a network entity, a first message requesting to set up an E-UTRAN radio access bearer (E-RAB) for a mission critical service (MCS), the first message containing first indication information for indicating to set up an alternative link between a terminal and at least one second base station; transmitting, to the at least one second base station, a second message requesting to set up an alternative link with the terminal, based on the received first message; and receiving, from the at least one second base station, a response message to the second message, the second message containing second indication information for indicating to set the SRB (Signaling Radio Bearer) state of the alternative link to inactive.

Furthermore, in the present invention, the method further comprises transmitting, to the terminal, a broadcast message containing control information related to the MCS.

Furthermore, in the present invention, the control information comprises at least either information indicating a radio link quality threshold for supporting the MCS or information on the maximum number of alternative links indicating the maximum number of alternative links that can be set up.

Furthermore, in the present invention, the first message further comprises a QoS class identifier (QCI) indicating the MCS.

Furthermore, in the present invention, the method further comprises the steps of: transmitting, to the at least one second base station, a fourth message for requesting the load status of the at least one second base station; and receiving, from the at least one second base station, a fifth message containing current load status information.

Furthermore, in the present invention, the current load status information is either high, medium, or low.

Furthermore, in the present invention, the method further comprises the step of receiving the C-RNTI (cell-radio network temporary identifier) of the second base station and timing advance (TA) information related to uplink synchronization between the terminal and the second base station.

Furthermore, in the present invention, the TA information comprises at least either TA tracking indication information or TA tracking period information.

Furthermore, in the present invention, the method further comprises the steps of: transmitting, to the terminal, an RRC connection reconfiguration message for indicating that an alternative link to the at least one second base station has been set up; and receiving, from the terminal, an RRC connection reconfiguration complete message as a response to the RRC connection reconfiguration message.

Furthermore, in the present invention, the RRC connection reconfiguration message further contains dedicated random access preamble information the at least one second base station allocates to the terminal.

Furthermore, in the present invention, the method further comprises the steps of: transmitting, to the at least one second base station, the allocated dedicated random access preamble through a PRACH (physical random access channel); and receiving, from the at least one second base station, a random access response to the PRACH.

Furthermore, in the present invention, the method C-RNTI and the TA information are included in either the response message, the RRC connection reconfiguration message, or the random access response.

Furthermore, in the present invention, the at least one second base station satisfies a radio link quality condition for supporting the MCS.

Furthermore, in the present invention, the method further comprises the step of performing an E-RAB connection release procedure for the terminal with the network entity.

Furthermore, in the present invention, third indication information indicating the release of an alternative link between the terminal and the at least one second base station is transmitted and received through the E-RAB connection release procedure.

Furthermore, in the present invention, the method further comprises the steps of: transmitting, to the at least one second base station, a sixth message requesting the release of an alternative link from the terminal; and performing an RRC connection reconfiguration procedure with the terminal.

Furthermore, in the present invention, the method further comprises the steps of: receiving, from the terminal, fourth indication information indicating a deterioration in the quality of a serving link for the MCS; transmitting, to the at least one second base station, a seventh message for requesting to activate the alternative link to the at least one second base station based on the fourth indication information; receiving a response message to the seventh message from the at least one second base station; determining a second base station to substitute for the first base station based on the received response message; and receiving, from the determined second base station, a ninth message indicating that the activation of the alternative link is complete.

Furthermore, in the present invention, the method further comprises the step of receiving, from the terminal, a list of additional second base stations discovered by the terminal.

Furthermore, in the present invention, the ninth message is received from the at least one second base station immediately after the eighth message is transmitted to the determined second base station.

Another embodiment of the present specification provides a base station, which is a first base station for setting up a bearer in a wireless communication system, the base station comprising: a communication unit that transmits and receives radio signals to and from the outside; and a processor functionally attached to the communication unit, wherein the processor is controlled to receive, from a network entity, a first message requesting to set up an E-UTRAN radio access bearer (E-RAB) for a mission critical service (MCS), to transmit, to at least one second base station, a second message requesting to set up an alternative link with a terminal, based on the received first message, and receive, from the at least one second base station, a response message to the second message, the first message containing first indication information for indicating to set up an alternative link between the terminal and the at least one second base station, and the second message containing second indication information for indicating to set the SRB (Signaling Radio Bearer) state of the alternative link to inactive.

Advantageous Effects

The present specification has the advantage of setting up and releasing multi-links with a plurality of base stations only when a terminal needs to be provided with MCS, by defining a method for setting up and releasing multi-links based on a network indication.

Moreover, the present specification allows for setting up an MCS bearer more quickly through an alternative link base station whose RRC connection is activated, by defining a new radio link quality threshold for an MCS and performing the activation of an alternative link to the alternative base station.

This can satisfy a short delay requirement for the MCS and a high reliability requirement at the same time, thereby delivering important and reliable communication.

Furthermore, the present specification ensures sufficient service availability to be provided with MCSs by periodically tracking TAs for preset alternative base stations, since the terminal itself sets up and renews connections for alternative links present around it.

In addition, the present specification may (1) cope with connection failures quickly, (2) implement high-reliability cloud connectivity, and (3) improve data rates for MCSs by always securing neighboring available alternative links to avoid link outage.

Advantages which may be obtained by the present invention are not limited to the aforementioned advantages, and various other advantages may be evidently understood by those skilled in the art to which the present invention pertains from the following description.

DESCRIPTION OF DRAWINGS

FIG. 1 is a view illustrating an Evolved Packet System which is associated with the Long Term Evolution (LTE) system to which the present invention may apply.

FIG. 2 illustrates a wireless communication system to which the present invention applies.

FIG. 3 illustrates a functional split of an E-UTRAN and an EPC to which the present invention may apply.

FIG. 4A is a diagram illustrating a radio protocol architecture for a user plane to which technical features of the present specifications are applicable.

FIG. 4B is a diagram illustrating a radio protocol architecture for a control plane to which technical features of the present specification are applicable.

FIG. 5 illustrates an S1 interface protocol structure in a wireless communication system to which the present invention may apply.

FIG. 6 is a diagram illustrating EMM and ECM states in a wireless communication system to which the present invention may apply.

FIG. 7 is a diagram illustrating a bearer structure in a wireless communication system to which the present invention may apply.

FIG. 8 is a diagram illustrating transmission paths of a control plane and a user plane in an EMM registration state in a wireless communication system to which the present invention may apply.

FIG. 9 is a diagram illustrating an example of a Dedicated Bearer Activation procedure in a wireless communication system to which the present invention may apply.

FIG. 10 is a diagram illustrating an example of a dedicated bearer deactivation procedure.

FIG. 11 illustrates a handover process defined in the LTE.

FIG. 12 is a diagram illustrating operational processes for a UE and an eNB in a contention-based random access procedure.

FIG. 13 is a flowchart illustrating an operation of a UE in an RRC idle state to which the present invention may apply.

FIG. 14 is a flowchart showing an RRC connection establishment procedure to which the present invention may apply.

FIG. 15 is a flowchart showing an RRC connection reconfiguration procedure to which the present invention may apply.

FIG. 16 is a view illustrating an example of an RRC connection re-establishment procedure to which the present invention may apply.

FIG. 17 is a diagram an example of a method for performing measurement to which the present invention may apply.

FIG. 18 is a conceptual diagram of alternative links to which the methods proposed in the present invention may apply.

FIGS. 19 to 21 are flowcharts illustrating examples of a method for setting up multi-links based on a network indication, as proposed in the present specification.

FIGS. 22 and 23 are flowcharts illustrating examples of a method for releasing multi-links based on a network indication, as proposed in the present specification.

FIGS. 24 to 26 are flowcharts illustrating examples of a method for activating an alternative link to an alternative base station and setting up an MCS bearer when the radio link quality of a serving base station is deteriorated, as proposed in the specification.

FIG. 27 is a block diagram illustrating a wireless device by which the methods proposed in the specification may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc.

The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

Prior to going further to the description taken in conjunction with the drawings, the terms used herein are briefly defined for ease of understanding.

EPS: abbreviation of Evolved Packet System. Means a core network supporting a long term evolution (LTE) network. An evolved network of UMTS.

PDN (public data network): independent network where a servicing server is positioned.

APN (access point name): Name of an access point managed by a network, which is provided to UE. That is, the name of PDN (character string). Based on the name of the access point, a PDN for transmission/reception of data is determined.

TEID (tunnel endpoint identifier): End point ID of a tunnel configured between nodes in a network, configured per period on a per UE bearer basis.

MME: abbreviation of Mobility Management Entity. Functions to control each entity in the EPS to provide mobility and session for the UE.

Session: path for data transmission, and its unit may be PDN, bearer, or IP flow.

The differences between the units may be divided into an overall target network unit (APN or PDN unit), a unit separated with QoS therein (bearer unit), and a destination IP address unit as defined in 3GPP.

PDN connection: refers to connection from a terminal to PDN, i.e., correlation (connection) between a terminal represented in an IP address and PDN represented in APN. This means connection (terminal-PDN GW) between entities in the core network so that the session may be formed.

UE context: circumstance information of UE used to manage the UE in the network. That is, circumstance information consisting of UE id, mobility (e.g., current position), or attribute of session (QoS, priority, etc.).

FIG. 1 is a view illustrating an Evolved Packet System which is associated with the Long Term Evolution (LTE) system to which the present invention may apply.

The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE.

When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA).

Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention applies.

The wireless communication system may also be referred to as an evolved-UMTS terrestrial radio access network (E-UTRAN) or a long term evolution (LTE)/LTE-A system. The E-UTRAN includes at least one base station (BS) 20 which provides a control plane and a user plane to a user equipment (UE) 10.

The base stations 20 are interconnected by means of an X2 interface. The base stations 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the base station.

FIG. 3 illustrates a functional split of an E-UTRAN and an EPC to which the present invention may apply.

Referring to the FIG. 3, shaded blocks represent radio protocol layers, and empty blocks represent functional entities of the control plane.

The base station performs the following functions: (1) radio resource management (RRM) function such as radio bearer (RB) control, radio admission control, connection mobility control, dynamic resource allocation to the UE; (2) IP (Internet Protocol) header compression and decryption of user data stream; (3) routing of user plane data to a serving gateway (S-GW); (4) scheduling and transmission of a paging message; (5) scheduling and transmission of broadcast information; and (6) measurement for mobility and scheduling and establishing a measurement report.

An MME performs the following functions: (1) distribution of paging messages to base stations; (2) security control; (3) idle state mobility control; (4) S bearer control; (5) ciphering and integrity protection of NAS (Non-Access Stratum) signaling.

The S-GW performs the following functions: (1) termination of a user plane packet with respect to paging; and (2) user plane switching to support UE mobility.

FIG. 4A is a diagram illustrating a radio protocol architecture for a user plane to which technical features of the present specifications are applicable. FIG. 4B is a diagram illustrating a radio protocol architecture for a control plane to which technical features of the present specification are applicable.

The user plane is a protocol stack for user data transmission. The control plane is a protocol stack for control signal transmission.

Referring to FIGS. 4A and 4B, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

FIG. 5 illustrates an S1 interface protocol structure in a wireless communication system to which the present invention may apply.

(a) of FIG. 5 illustrates the control plane protocol stack in the S1 interface, and (b) of FIG. 5 illustrates the user plane interface protocol structure in the S1 interface.

With reference to FIG. 5, the S1 control plane interface (S1-MME) is defined between the eNB and the MME. The transport network layer is built on IP transport, similarly to the user plane, but for the reliable transport of signaling messages SCTP is added on top of IP. The application layer signaling protocol is referred to as S1-AP (S1 Application Protocol).

The SCTP layer provides guaranteed delivery of application layer messages.

The transport IP layer employs point-to-point transmission for Protocol Data Unit (PDU) signaling transmission.

For each S1-MME interface instance, a single SCTP association uses a pair of stream identifiers for the S1-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying UE-specific S1-MME signaling transmission bearer. The communication context identifier is delivered within each S1-AP message.

If the S1 signaling transport layer notifies the S1AP layer of disconnection of signaling, the MME changes the state of the UE which has used the corresponding signaling connection to ECM-IDLE state. Furthermore, the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

EMM and ECM States

EPS Mobility Management (EMM) and EPS Connection Management (ECM) states will be described.

FIG. 6 illustrates an EMM and ECM states in a wireless communication system to which the present invention may apply.

With reference to FIG. 6, to manage mobility of the UE in the NAS layer defined in the control planes of the UE and the MME, EMM-REGISTERED and EMM-DEREGISTERED states may be defined depending on whether the UE is attached to or detached from a network. The EMM-REGISTERED and the EMM-DEREGISTERED states may be applied to the UE and the MME.

Initially, the UE stays in the EMM-DEREGISTERED state when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Likewise, to manage signaling connection between the UE and the network, ECM-CONNECTED and ECM-IDLE states may be defined. The ECM-CONNECTED and ECM-IDLE states may also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, if RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network may identify the UE staying in the ECM-CONNECTED state at the level of cell unit and may control the UE in an effective manner.

Meanwhile, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE may receive a broadcast of system information and paging information by monitoring a paging signal at a specific paging occasion for each piece of UE-specific paging DRX cycle.

When the UE is in the ECM-IDLE state, the network does not carry context information of the UE. Therefore, the UE staying in the ECM-IDLE state may perform a mobility-related procedure based on the UE, such as cell selection or cell reselection, without necessarily following an order of the network. If the position of the UE differs from the position recognized by the network while the UE is in the ECM-IDLE state, the UE may inform the network of the corresponding position of the UE through a Tracking Area Update (TAU) procedure.

Meanwhile, when the UE is in the ECM-CONNECTED state, mobility of the UE is managed by an order of the network. While the UE stays in the ECM-CONNECTED state, the network knows to which cell the UE currently belongs. Therefore, the network may transmit and/or receiver data to or from the UE, control mobility of the UE, such as handover, and perform cell measurement with respect to neighboring cells.

As described above, the UE has to make a transition to the ECM-CONNECTED state in order to receive a general mobile communication service, such as a voice or data communication service. When the UE is first powered on, the UE in its initial state stays in the ECM-IDLE state as in the EMM state, and if the UE successfully registers to the corresponding network through an initial attach procedure, the UE and the MME make a transition to the ECM connection state. Furthermore, if UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

FIG. 7 illustrates a bearer structure in a wireless communication system to which the present invention may apply.

When a UE is connected to a Packet Data Network (PDN) (which is the peer entity of FIG. 7), a PDN connection is established, which may also be called an EPS session. The PDN provides a service function such as the Internet or IP Multimedia Subsystem (IMS) through an external or internal IP network of a service provider.

An EPS session comprises one or more EPS bearers. The EPS bearer refers to the transmission path of traffic generated between the UE and the PDN GW for the EPS to deliver user traffic. One or more EPS bearers may be set up for each UE.

Each EPS bearer may be classified into E-UTRAN Radio Access Bearer (E-RAB) or S5/S8 bearer, and the E-RAB may be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. When an E-RAB is existed, the E-RAB bearer is one-to-one mapped to the EPS bearer. A Data Radio Bearer (DRB) delivers packets of the EPS bearer between the UE and the eNB. When a DRB is existed, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is an IP flow or a group of IP flows obtained by classifying (or filtering) user traffic according to an individual service. A plurality of SDFs may be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs may be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer may be one of two types: a default bearer and a dedicated bearer. The UE may have one default bearer and one or more dedicated bearers for each PDN. The minimum basic bearer that the EPS session may have with respect to one PDN is called the default bearer.

The EPS bearer may be classified on the basis of its identity. The EPS bearer identity is allocated by the UE or the MME. The dedicated bearer(s) is combined with the default bearer by a Linked EPS Bearer Identity (LBI).

When the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And when new traffic is generated in the corresponding PDN, the E-RAB bearer is reconfigured to deliver traffic.

When the UE attempts to use a service of which the Quality of Service (QoS) (e.g., Video on Demand (VoD) service, etc.) may not be supported by the default bearer while using a service (e.g., the Internet) through the default bearer, a dedicated bearer is created when the UE demands the high QoS service. In the case there is no traffic from the UE, the dedicated bearer is released. The UE or the network may create a plurality of dedicated bearers depending on needs.

Depending on which service the UE uses, the IP flow may have different QoS characteristics. When the EPS session for the UE is established or modified, the network allocates network resources; or determines a control policy about QoS and applies the policy while the EPS session is maintained. The aforementioned operation is called the Policy and Charging Control (PCC). The PCC rule is determined based on the operator's policy (e.g., a QoS policy, gate status, charging method, etc.).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or needs to be rejected in case of resource limitations. Also, the ARP can be used by the eNB to determine which bearer(s) to drop during periods of exceptional limited resources (e.g., handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers can be used together.

Once the QoS of the EPS bearer is determined, the QoS of each bearer is determined for each interface. Since the bearer of each interface provides QoS of the EPS bearer according to the interface, the EPS bearer, RB, and S1 bearer all have a one-to-one relationship among them.

When the UE, while using a service through the default bearer, uses a service that the default bearer alone is not enough to provide sufficient QoS, a dedicated bearer is generated on-demand.

FIG. 8 illustrates transmission paths of a control plane and a user plane in an EMM registration state in a wireless communication system to which the present invention may apply.

(a) of FIG. 8 illustrates ECM-CONNECTED state, and (b) of FIG. 8 illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in (a) of FIG. 8, in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, the DRB, S1 bearer, and S5 bearer are all set up (that is, radio or network resources are allocated).

As shown in (b) of FIG. 8, in the ECM-IDLE state where there is no user traffic, the ECM connection (that is, RRC connection and S1 signaling connection) is released. However, the S11 GTP-C connection between the MME and the SGW and the S5 GTP-C connection between the SGW and the PDN GW are retained.

Also, in the ECM-IDLE state, the DRB and the S1 bearer are all released, but the S5 bearer is retained (that is, radio or network resources are allocated).

FIG. 9 is a diagram illustrating an example of a Dedicated Bearer Activation procedure in a wireless communication system to which the present invention may apply.

FIG. 9 is a flowchart illustrating a dedicated bearer activation procedure for S5/S8 based on a GTP (GPRS Tunneling Protocol).

First of all, if dynamic PCC is deployed, the PCRF sends a PCC decision provision (QoS policy) message to the PDN GW.

Next, the PDN GW sends a Create Bearer Request message (IMSI, PTI, EPS Bearer QoS, TFT, S5/S8 TEID, Charging Id, LBI, Protocol Configuration Options) to the Serving GW.

Next, the serving GW sends a Create Bearer Request (IMSI, PTI, EPS Bearer QoS, TFT, S1-TEID, PDN GW TEID (GTP-based S5/S8), LBI, Protocol Configuration Options) message to an MME.

Next, the MME sends a Bearer Setup Request (EPS Bearer Identity, EPS Bearer QoS, Session Management Request, S1-TEID) message for requesting a bearer configuration to an eNodeB.

Next, the eNodeB sends an RRC Connection Reconfiguration (Radio Bearer QoS, Session Management Request, EPS RB Identity) message to UE.

Next, the UE sends an RRC Connection Reconfiguration Complete message to the eNodeB in order to provide notification of radio bearer activation.

Next, the eNodeB sends a Bearer Setup Response (EPS Bearer Identity, S1-TEID) message to the MME in order to provide notification of radio bearer activation in the UE.

Next, the UE sends a Direct Transfer (Session Management Response) message to the eNodeB.

Next, the eNodeB sends an Uplink NAS Transport (Session Management Response) message to the MME.

Next, the MME sends a Create Bearer Response (EPS Bearer Identity, S1-TEID, user location information (ECGI)) message to the serving GW in order to notify the serving GW of bearer activation.

Next, the serving GW sends a Create Bearer Response (EPS Bearer Identity, S5/S8-TEID, User Location Information (ECGI)) message to the PDN GW in order to notify the PDN GW of bearer activation.

If the dedicated bearer activation procedure has been triggered by a PCC Decision Provision message from the PCRF, the PDN GW indicates to the PCRF whether a requested PCC decision (QoS policy) has been performed.

FIG. 10 is a diagram illustrating an example of a dedicated bearer deactivation procedure.

FIG. 10 is a flowchart illustrating a dedicated bearer deactivation procedure for S5/S8 based on a GTP (GPRS tunneling protocol).

The procedure of FIG. 10 may be used to deactivate a dedicated bearer or to deactivate all bearers belonging to a PDN address.

If a default bearer belonging to PDN connection is deactivated, a PDN GW deactivates all bearers belonging to the PDN connection. For a detailed procedure, reference is made to FIG. 10.

FIG. 11 illustrates a handover process defined in the LTE.

FIG. 11 shows a case in which MME and a serving gateway are not changed.

The handover process is described below in detail with reference to 3GPP TS (Technical Specification) 36.300.

Step 0: UE context in a source base station eNB includes information on connection setup or roaming restriction set in the event of latest TA update.

Step 1: The source base station sets up an UE measurement process based on area restriction information. The measurement provided by the source base station can assist in controlling the connection mobility of an UE.

Step 2: The UE is triggered to transmit measurement report according to a rule set by system information, etc.

Step 3: The source base station determines whether or not to handover the UE on the basis of the measurement report and RRM (Radio Resource Management) information.

Step 4: The source base station transmits information for a handover (HO) to a target base station through a handover request message. The information required for the handover includes UE X2 signaling context reference, UE S1 EPC signaling context reference, target cell ID, RRC context including UE identifier (for example, Cell Radio Network Temporary Identifier; C-RMTI) in the source base station, etc.

Step 6: The target base station prepares L1/L2 and HO and transmits a handover request acknowledge (Ack) message to the source base station. The handover request Ack message includes a transparent container (RRC message) transmitted to the UE to perform the handover. The container includes new C-RNTI and a security algorithm identifier of the target base station. In addition, the container may additionally include an access parameter and an additional parameter such as SIB.

Furthermore, the target base station can divide RA signatures into a non-contention based RA signature set (referred to as group 1 hereinafter) and a contention based RA signature set (referred to as group 2 hereinafter) and select one of signatures of group 1 and inform the UE of the selected signature, in order to minimize handover delay.

That is, the container may further include information on a dedicated RA signature. Moreover, the container may include information on an RACH slot duration for which the dedicated RA signature will be used.

Step 7: The source base station generates an RRC message (for example, RRCConnectionReconfiguration message) having mobility control information on the UE and transmits the RRC message to the UE in order to perform the handover.

The RRCconnectionreconfiguration message includes parameters required for the handover (for example, new C-RNTI and the security algorithm identifier of the target base station, and information on the dedicated RACH signature and target base station SIB which are optional) and indicates to perform the HO.

Step 8: The source base station transmits a SN (serial number) status transfer message to the target base station so as to notify of the uplink PDCP SN reception status and the downlink PDCP SN transmission status.

Step 9: The UE attempts to access a target cell using a RACH process after receiving the RRCconnectionReconfiguration message. The RACH is performed on a non-contention basis if a dedicated RACH preamble is allocated; otherwise, on a contention basis.

Step 10: The network performs uplink allocation and timing adjustment.

Step 11: When the UE successfully accesses the target cell, the UE transmits RRCConnectionReconfigurationComplete message (C-RNTI) to confirm the handover and transmits an uplink buffer status report to thereby inform the target base station that the handover process is completed. The target base station confirms a received C-RNTI through a handover confirmation message and starts sending data to the UE.

Step 12: The target base station transmits a path switch message to the MME so as to indicate that the UE has changed the cell.

Step 13: The MME transmits a user plane update request message to a serving gateway.

Step 14: The serving gateway switches a downlink data path to the target base station. The serving gateway transmits an end marker packet on the old path to the source base station and then releases any user plane/TNL resources towards the source base station.

Step 15: The serving gateway transmits a user plane update response message to the MME.

Step 16: The MME responds to the path switch message using a path switch Ack message.

Step 17: The target base station informs the source base station of the success of HO by sending a UE context release message and triggers the release of resources.

Step 18: Upon reception of the UE context release message, the source base station releases radio resources and user plane-related resources associated with the UE context.

FIG. 12 is a diagram illustrating operational processes for a UE and an eNB in a contention-based random access procedure.

(1) Transmission of First Message

A UE may randomly select a random access preamble from a set of random access preambles indicated through system information or a Handover Command, select a Physical RACH (PRACH) resource capable of carrying the random access preamble, and transmit the random access preamble in the PRACH resource (S1201).

(2) Reception of Second Message

A method of receiving random access response information is similar to the above-described non-contention based random access procedure. That is, after transmitting the random access preamble in the step S1201, the UE attempts to receive a random access response thereof within a random access response reception window indicated through the system information or Handover Command by an eNB, and receives a PDSCH using corresponding RA-RNTI information (S1202). Through this, the UE may receive a UL grant, a temporary cell identifier (temporary C-RNTI), a time synchronization correction value (timing advance command: TAC) and the like.

(3) Transmission of Third Message

Upon receipt of a valid random access response, the UE processes information included in the random access response. That is, the UE applies the TAC and stores the temporary C-RNTI. In addition, the UE transmits data (i.e. a third message) to the eNB using the UL grant (S1203). The third message should include an ID of the UE. This is because the eNB cannot determine which UEs perform the random access procedure in the contention-based random access procedure and the UEs need to be identified for contention resolution.

Two methods have been discussed to include a UE identifier in the third message. According to a first method, if the UE has a valid cell identifier already allocated by a corresponding cell before the random access procedure, the UE transmits its own cell identifier by a UL transmission signal corresponding to the UL grant. On the other hand, if a valid cell identifier has not been allocated to the UE before the random access procedure, the UE transmits its unique identifier (e.g., an S-TMSI or a Random ID) in the third message. In general, the unique identifier is longer than a cell identifier. Once the UE has transmitted data corresponding to the UL grant, the UE starts a contention resolution timer.

(4) Reception of Fourth Message

After the UE transmits data including its own identifier through the UL grant that is included in the random access response, the UE awaits an indication from the eNB for contention resolution. That is, the UE may attempt to receive a PDCCH in order to receive a specific message (S1204). The UE may receive the PDCCH using two methods. In the case in which the UE has transmitted the third message in response to the UL grant using a cell identifier as its own identifier, the UE may attempt to receive a PDCCH using its own cell identifier. In the case in which the UE has transmitted the third message in response to the UL grant using an identifier specific to the UE as its own identifier, the UE may attempt to receive a PDCCH using a temporary C-RNTI included in the random access response. In the former case, when the UE has received a PDCCH through its own cell identifier before the contention resolution timer expires, the UE may determine that the random access procedure has been properly performed and then terminate the random access procedure. In the latter case, when the UE has received a PDCCH through a temporary C-RNTI before the contention resolution timer expires, the UE checks data carried in a PDSCH indicated by the PDCCH. If the UE-specific identifier is included in the data, the UE may determine that the random access procedure has been properly performed and then terminate the random access procedure.

Hereinafter, an RRC state of a UE and an RRC connection mechanism will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled.

On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

An NAS (Non-Access Stratum) layer located in an upper RRC layer performs session management and mobility management.

In order to manage the mobility of the UE, two states of EMM-REGISTERED (EPS Mobility Management-REGISTERED) and EMM-DEREGISTERED are defined, and the two states apply to the UE and the MME. Initially, the UE is in the EMM-DEREGISTERED state, and in order for the UE to connect to the network, a process of registering to a corresponding network is performed through an initial attach procedure. When the attach procedure is successfully performed, the UE and the MME are in the EMM-REGISTERED state.

To manage a signaling connection between the UE and the EPC, two states of an ECM (EPS Connection Management)-IDLE state and an ECM-CONNECTED state are defined, and the two states are applied to the UE and the MME. When a UE in the ECM-IDLE establishes an RRC connection with the E-UTRAN, the corresponding UE is in the ECM-CONNECTED state.

When the MME in the ECM-IDLE state establishes an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a UE-based, mobility-related procedure such as cell selection or cell reselection without having to receive a command from the network. On the other hand, when the UE is in the ECM-CONNECTED state, the mobility of the UE is managed by a command from the network. When the location of the UE in the ECM-IDLE state is different from a location known to the network, the UE notifies the network of the UE's location through a tracking area update procedure.

Next, system information is described.

The system information includes essential information which must be known in order for a UE to connect to a base station. Therefore, the UE must receive all the system information before the UE is connected to the base station, and also the UE needs to have the latest system information. Since the system information is the information which must be known to all UEs within a cell, the base station periodically transmits the system information.

According to Section 5.2.2 of 3GPP TS 36.331 V8.7.0 (2009-09) "Radio Resource Control (RRC); Protocol specification (Release 8)," the system information is divided into MIB (Master Information Block), SB (Scheduling Block), and SIB (System Information Block). The MIB enables the UE to be aware of a physical configuration of a corresponding cell, for example, a bandwidth. The SB informs transmission information of the SIBs, for example, a transmission period. The SIB is a collection of system information that are related to one another. For example, a certain SIB includes information only about a surrounding cell and a certain SIB includes information only about an uplink radio channel used by the UE.

Generally, a service provided by the network to the UE can be divided into three types as below. In addition, the UE recognizes a cell type depending on which service is available. A service type is first described below and the cell type is described later.

1) Limited service: This service provides an emergency call and a disaster warning system (Earthquake and Tsunami Warning System; ETWS) and may be provided in an acceptable cell.

2) Normal service: This service means a public-use service for a general purpose and may be provided in a suitable or normal cell.

3) Operator service: This service means a service for a communication network operator, and this cell can be used only by the network operator, not by a general user.

Regarding the service type provided by the cell, the cell type may be classified as follows.

1) Acceptable cell: a cell in which the UE may be provided with a limited service. The cell is not barred and satisfies a cell's selection criteria.

2) Suitable cell: a cell in which the UE may be provided with a regular service. This cell satisfies a condition for the acceptable cell while satisfying additional conditions at the same time. The additional conditions are that this cell must belong to a PLMN (Public Land Mobile Network) to which a corresponding UE can connect and must be a cell in which the tracking area update procedure of the UE is not prohibited. If the corresponding cell is a CSG cell, this cell must be a cell to which the UE can connect to as a CSG member.

3) Barred cell: a cell which broadcasts information that the cell is barred through the system information.

4) Reserved cell: a cell which broadcasts information that the cell is reserved through the system information.

FIG. 13 is a flowchart illustrating an operation of a UE in an RRC idle state to which the present invention may apply.

FIG. 13 shows a procedure in which a UE is registered to a network through a cell selection process when the UE is initially powered on and a cell reselection is performed when necessary.

Referring to FIG. 13, the UE selects a Radio Access Technology (hereinafter, referred to as "RAT") for communicating with a Public Land Mobile Network (hereinafter, referred to as "PLMN") from which the UE itself desires to receive a service (S1310). The information about PLMN and RAT may be selected by the user of the UE, and what is stored in the USIM (universal subscriber identity module) may be also used.

The UE selects a cell having the largest value among the cells that the measured base station has a value greater than a particular value in the signal intensity and quality (cell selection) (S1320). Then, it receives SI being sent by the base station. The particular value denotes a value defined by a system to guarantee the quality of physical signals in the data transmission and/or reception. Accordingly, the value may vary based on the RAT to be applied.

The UE registers its own information (for example, IMSI) for receiving a service (for example, paging) from a network (S1330). Here, the UE is not registered into a network to be accessed whenever selecting a cell but registered into a network in case when network information received from SI (for example, Tracking Area Identity (TAI)) is different from network information that the UE itself knows.

The UE performs cell re-selection based on a service environment provided in a cell, a terminal environment, or the like (S1340). If a value of the signal intensity and quality measured by the base station from which the UE receives a service is less than a value measured by the base station of the neighboring cell, then the UE selects one of the other cells providing signals having better characteristics than those of the cell of the base station being accessed by the UE. This process is called a cell reselection to distinguish it from an initial cell selection in the second step. At this time, a time restriction condition may be specified in order to prevent a cell from being frequently reselected based on the change of the signal characteristics.

FIG. 14 is a flowchart showing an RRC connection establishment procedure to which the present invention may apply.

A UE sends to a network an RRC connection request message for requesting an RRC connection (S1410). The network sends an RRC connection setup message in response to the RRC connection request (S1420). After receiving the RRC connection setup message, the UE enters an RRC connection mode.

The UE sends to the network an RRC connection setup complete message used to confirm successful completion of the RRC connection establishment (S1430).

FIG. 15 is a flowchart showing an RRC connection reconfiguration procedure to which the present invention may apply.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (S1510). In response to the RRC connection reconfiguration, the UE sends to the network an RRC connection reconfiguration complete message used to confirm successful completion of the RRC connection reconfiguration (S1520).

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a cell of a proper quality. For example, a terminal where power is turned-on just before should select a cell of a proper quality to registered in a network. If the terminal in an RRC connection state enters in an RRC idle state, the terminal should select a cell for stay in the RRC idle state. In this way, a procedure of selecting a cell satisfying a certain condition by the terminal in order to be in a service idle state such as the RRC idle state refers to cell selection. Since the cell selection is performed when a cell in the RRC idle state has not been selected, it is important to select the cell as soon as possible.

Accordingly, as long as the cell provides more than a certain level of radio signal quality, the cell may be selected during a cell selection procedure of the terminal, even if the cell does not provide the best radio signal quality.

A method and procedure of selecting a cell by a terminal in a 3GPP LTE is described with reference to 3GPP TS 36.304 V8.5.0 (2009-03) "User Equipment (UE) procedures in idle mode (Release 8)".

A cell selection is largely divided into two processes.

The first process is an initial cell selection process. In this process, UE does not have preliminary information about a wireless channel. Accordingly, the UE searches all wireless channels to find a suitable cell. The UE searches for the strongest cell in each channel. Thereafter, once the UE finds a suitable cell that satisfies cell selection criteria, the UE selects the corresponding cell.

Next, the UE may select the cell using stored information or using information broadcasted by the cell. Accordingly, cell selection may be quickly done compared to an initial cell selection process. As long as the UE finds a cell that satisfies the cell selection criterion, the UE selects the corresponding cell. If any suitable cell that satisfies the cell selection criterion is not found though such a process, the UE performs an initial cell selection process.

After the UE selects a certain cell through a cell selection process, the signal strength and quality between the UE and the base station may be changed due to the change of the UE mobility and wireless environment. Therefore, if the quality of the selected cell is deteriorated, the UE may select another cell providing better quality. If a cell is reselected in this manner, this cell, in general, should be a cell that provides better signal quality than the currently selected cell.

This process is called a cell reselection. In terms of radio signal quality, in general, a basic purpose of the cell reselection process is to select a cell providing best quality to the UE.

Apart from radio signal quality, the network may determine the priority for each frequency and notify the UE about this. Upon receiving the priority, the UE may take this priority into consideration more than the radio signal quality criterion during the cell reselection process.

As described above, there is a method of selecting or reselecting a cell based on the signal property of the wireless environment. When a cell is selected for reselection in the cell reselection process, the following cell reselection methods may be used, based on the RAT and frequency characteristics of the cell.

Intra-frequency cell reselection: A reselected cell is a cell having the same RAT and same center-frequency as a cell on which the UE is currently camping.

Inter-frequency cell reselection: A reselected cell is a cell having the same RAT as a cell on which the UE is currently camping but has a different center-frequency than it.

Inter-RAT cell reselection: A reselected cell is a cell using a RAT different from the RAT of a cell on which the UE is currently camping.

The principles of the cell reselection process are as follows.

First, the UE measures the qualities of a serving cell and a neighboring cell for the cell reselection.

Second, the reselection is performed based on the cell reselection criterion. The cell reselection criterion has the following features in relation to the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called the best ranked cell. The cell index value is basically a value obtained by the UE measures on the corresponding cell, to which a frequency offset or cell offset is used as necessary.

The inter-frequency cell reselection is based on a frequency priority provided by the network. The UE attempts to camp on a frequency having the highest frequency priority. The network may provide the frequency priority common for in-cell UEs through broadcast signaling or provide a frequency-specific priority for each UE through UE-dedicated signaling. The cell reselection priority provided through broadcast signaling may be called a common priority, and the cell reselection priority set for each UE by the network may be called a dedicated priority. If the UE receives the dedicated priority, the UE may receive the relevant validity time along with the dedicated priority. Upon receiving the dedicated priority, the UE starts the validity timer which is set to the received validity time. The UE applies the dedicated priority in the RRC idle mode while the validity timer is operating. When the validity timer expires, the UE discards the dedicated priority and applies the common priority again.

For the inter-frequency cell reselection, the network may provide the UE with a parameter (e.g., a frequency-specific offset) used in cell reselection for each frequency.

For the intra-frequency cell reselection or the inter-frequency cell reselection, the network may provide the UE with a Neighboring Cell List (NCL) used in cell reselection. The NCL includes a cell-specific parameter (e.g., a cell-specific offset) used in cell reselection.

For the intra-frequency or inter-frequency cell reselection, the network may provide the UE with a cell reselection black list used in cell reselection. The UE does not perform cell reselection on a cell included in the black list.

Hereinafter, RLM (Radio Link Monitoring) is described.

A UE monitors downlink quality based on a cell-specific reference signal in order to detect downlink radio link quality of a PCell.

The UE estimates downlink radio link quality for the purpose of monitoring the downlink radio link quality of the PCell and compares the estimated quality with thresholds Qout and Qin. The threshold Qout is defined as a level that does not allow for stable reception via a downlink radio link, and this corresponds to a 10% block error rate of hypothetical PDCCH transmission considering PDFICH errors. The threshold Qin is defined as a downlink radio link quality level that allows for more stable reception than the threshold Qout, and this corresponds to a 2% block error rate of hypothetical PDCCH transmission, with PCFICH errors taken into account.

Hereinafter, a radio link failure (RLF) is described.

A UE continues to perform measurement in order to maintain the quality of a radio link with a serving cell receiving a service. The UE determines whether or not communication is impossible under the current circumstance due to a deterioration of the quality of the radio link with the serving cell.

If the quality of the serving cell is too low and thus communication is nearly impossible, the UE determines the current circumstance as a radio link failure.

If a radio link failure is determined, the UE abandons maintaining communication with the current serving cell, selects a new cell through a cell selection (or cell reselection) procedure, and attempts an RRC connection re-establishment to the new cell.

The UE, if the following problems occur on the radio link, may determine that RLF has occurred.

(1) First, it may be determined that RLF has occurred due to a physical channel problem.

If the quality of RS (reference signal) periodically received from an eNB over a physical channel is detected as equal to or smaller than a threshold, the UE may determine that an out-of-sync condition has occurred in the physical channel. If the out-of-sync condition occurs consecutively a specific number of times (e.g., N310), an RRC is notified about this. Having received an out-of-sync message from a physical layer, the RRC runs a timer T310, and waits for the problem with the physical channel to be solved while the timer T310 is running. If the RRC receives a message indicating that an in-sync condition has occurred consecutively a specific number of times (e.g., N311), from the physical layer while the timer T310 is running, the RRC determines that the physical channel problem has been solved and then stops the running timer T310. On the contrary, if the RRC receives no in-sync message until the timer T310 expires, the RRC determines that an RLF has occurred.

(2) It may be determined that an RLF has occurred due to a MAC random access problem.

The UE, while performing the random access procedure at the MAC layer, goes through random access resource selection→random access preamble transmission→random access response reception→contention resolution. The above overall process is referred to as one random access procedure, and unless this procedure is successfully done, the next random access procedure is carried out after waiting a backoff time. If such a random access procedure is unsuccessful despite a predetermined number (e.g., preambleTransMax) of attempts, the RRC is informed about this, and the RRC then determines that an RLF has occurred.

(3) It may be determined that an RLF has occurred due to an RLC maximum retransmission problem.

If AM (Acknowledged Mode) RLC is used at the RLC layer, the UE retransmits an RLC PDU that was not successfully transmitted.

However, if a predetermined number of (e.g., maxRetxThreshold) of attempts to retransmit a specific AMD PDU do not succeed in the AM RLC, the RRC is informed about this and the RRC then determines that an RLF has occurred.

The RRC determines that an RLF occurs due to the above three reasons. If an RLF occurs thusly, an RRC connection re-establishment is performed to re-establish an RRC connection with the eNB.

The RRC connection re-establishment procedure is performed as follows when an RLF occurs.

If the UE determines that a serious problem with an RRC connection has occurred, it performs an RRC connection re-establishment procedure in order to re-establish a connection with the eNB. The serious problem with the RRC connection may include the following five problems: (1) radio link failure (RLF); (2) handover failure; (3) mobility from E-UTRA; (4) PDCP integrity check failure; and (5) RRC connection reconfiguration failure.

If one of the above problems occurs, the UE runs the timer T311 and initiates an RRC connection re-establishment procedure. During this procedure, the UE goes through a cell selection random access procedure to connect to a new cell.

If a suitable cell is found through a cell selection procedure while the timer T311 is running, the UE stops the timer T311 and starts a random access procedure to the corresponding cell. However, if the UE cannot find a suitable cell until the timer T311 expires, the UE regards it an RRC connection failure and transitions to RRC_IDLE mode.

The RRC connection re-establishment procedure is now described below in greater detail.

FIG. 16 is a view illustrating an example of an RRC connection re-establishment procedure to which the present invention may apply.

Referring to FIG. 16, the UE stops using all configured radio bearers except SRB 0 (Signaling Radio Bearer #0) and initializes various sub-layers of AS (Access Stratum) (S1610). Further, the UE sets up each sub-layer and physical layer as default configuration. During such procedure, the UE maintains the RRC connection state.

The UE performs a cell selection procedure for conducting an RRC connection reestablishment procedure (S1620). Although the UE maintains the RRC connection state during the RRC connection reestablishment procedure, the cell selection procedure may be performed in the same way as the cell selection procedure performed by the UE in the RRC idle mode.

After performing the cell selection procedure, the UE identifies the system information on a corresponding cell to determine whether the corresponding cell is a proper cell (S1630). If the selected cell is determined to be a proper E-UTRAN cell, the UE sends an RRC connection reestablishment request message to the corresponding cell (S1640).

On the other hand, if the cell selected through the cell selection procedure for performing the RRC connection reestablishment procedure is determined to be a cell using an RAT other than the E-UTRAN, the UE stops the RRC connection reestablishment procedure and enters the RRC idle state (S1650).

The UE may be implemented to complete checking whether the cell is proper within a limited time through the cell selection procedure and reception of the system information on the selected cell. To this end, the UE may run a timer as the UE initiates the RRC connection reestablishment procedure. If it is determined that the UE has selected a proper cell, the timer may be stopped. When the timer expires, the UE considers it a failure of the RRC connection reestablishment procedure and may enter the RRC idle mode. This timer is hereinafter referred to as a radio link failure timer. According to the LTE spec. TS 36.331, a timer named T311 may be used as the radio link failure timer. The UE may obtain set values for the timer from the system information of the serving cell.

Upon receiving the RRC connection reestablishment request message from the UE and accepting the request, the cell transmits an RRC connection reestablishment message to the UE.

Upon receiving the RRC connection reestablishment message from the cell, the UE reconfigures a PDCP sub-layer and an RLC sub-layer for SRB1. Further, the UE recalculates various key values relating to security configuration and reconfigures the PDCP sub-layer that is in charge of security with the newly calculated security key values.

By doing so, SRB 1 between the UE and the cell is opened, and RRC control messages may be communicated therebetween. The UE completes resuming SRB1 and sends to the cell an RRC connection reestablishment complete message indicating that the RRC connection reestablishment procedure is complete (S1660).

On the contrary, unless the cell receives the RRC connection reestablishment request message from the UE and accepts the request, the cell transmits an RRC connection reestablishment reject message to the UE.

Once the RRC connection reestablishment procedure is successfully done, the cell and the UE perform an RRC connection reestablishment procedure. By doing so, the UE restores to the state as it was before performing the RRC connection reestablishment procedure and guarantees maximum service continuity.

Next, RLF reporting is now described.

The UE, if an RLF or handover failure occurs, reports such a failure event to the network in order to support MRO (Mobility Robustness Optimisation) of the network.

After the RRC connection reestablishment, the UE may provide an RLF report to the eNB. The radio measurements contained in the RLF Report may be used to identify coverage issues as the potential cause of the failure. This information may be used to exclude those events from the MRO evaluation of intra-LTE mobility connection failures and redirect them as input to other algorithms.

In case the RRC re-establishment fails or the UE does not perform any RRC re-establishment, the UE may make the RLF Report available to the eNB after reconnecting from idle mode. For this purpose, The UE stores the latest RLF or handover failure related information, and indicates RLF report availability at each subsequent LTE RRC connection (re-)establishment and handover to an LTE cell until the RLF report is fetched by the network or for 48 hours after the RLF or handover failure is detected.

The UE keeps the information during state transitions and RAT changes, and indicates RLF report availability again after it returns to the LTE RAT.

Availability of the RLF Report at the RRC connection setup procedure is the indication that the UE suffered from a connection failure and that the RLF Report from this failure was not yet delivered to the network. The RLF Report from the UE includes the following information:

- The E-CGI of the last cell that served the UE (in case of RLF) or the target of the handover (in case of handover failure). If the E-CGI is not known, the PCI and frequency information are used instead.
- E-CGI of the cell that the re-establishment attempt was made at.
- E-CGI of the cell that served the UE at the last handover initialization, i.e. when message 7 (RRC Connection Reconfiguration) was received by the UE.
- Time elapsed since the last handover initialization until connection failure.
- An indication whether the connection failure was due to RLF or handover failure.
- The radio measurements.
- Location of failure The eNB receiving the RLF Report from the UE may forward the report to the eNB that served the UE before the reported connection failure. The radio measurements contained in the RLF Report may be used to identify coverage issues as the potential cause of the failure. This information may be used to exclude those events from the MRO evaluation of intra-LTE mobility connection failures and redirect them as input to other algorithms.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like. Measurement for such a purpose is often called radio resource management (RRM) measurement.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identity (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band.

Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement.

The UE performs the intra-frequency measurement and reports a measurement result to the network at a proper time, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network at an appropriate time.

When the UE supports measurement on a heterogeneous network based on different RATs, measurement on a cell of the heterogeneous network may be performed according to a configuration of a base station. Such a measurement is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

FIG. 17 is a diagram an example of a method for performing measurement to which the present invention may apply.

A UE receives measurement configuration information from a base station (S1710). A message including the measurement configuration information is referred to as a measurement configuration message. The UE performs measurement based on the measurement configuration information (S1720). If a measurement result satisfies a reporting condition included in the measurement configuration information, the UE reports the measurement result to the base station (S1730). A message including the measurement result is referred to as a measurement report message.

The measurement configuration information may include the following information.

(1) Measurement object information: The is information about an object on which the UE will perform measurement. The measurement object includes at least one of an intra-frequency measurement object which is an object of measurement within a cell, an inter-frequency measurement object which is an object of measurement between cells, and an inter-RAT measurement object which is an object of inter-RAT measurement. For example, the intra-frequency measurement object may indicate a neighboring cell having the same frequency band as a serving cell, the inter-frequency measurement object may indicate a neighboring cell having a different frequency band from that of the serving cell, and the inter-RAT measurement object may indicate a neighboring cell with a different RAT from that of the serving cell.

(2) Reporting configuration information: This is information about a report condition regarding the time when UE reports a measurement result and a report type. The report configuration information may consist of a list of report configurations. Each report configuration may include a reporting criterion and a reporting format. The report criterion is a criterion that triggers the transmission of a measurement result by UE. The reporting criterion may be the cycle of a measurement report or a single event for a measurement report. The reporting format is information about that UE will configure a measurement result using what type.

(3) Measurement identity information: this is information about a measurement identity that associates a measurement object with a reporting configuration so that UE determines to report what measurement object when and in what type. The measurement identity information may be included in a measurement report message and may be indicative that a measured result is about what measurement object and that a measurement report has occurred due to what report condition.

(4) Quantity configuration information: this is information about a parameter for setting the filtering of a measurement unit, a report unit and/or a measured result value.

(5) Measurement gap information: this is information about a measurement gap, that is, a section that may be used for UE to perform only measurement by not taking into consideration data transmission with a serving cell because downlink transmission or uplink transmission has not been scheduled.

A UE has a measurement object list, a measurement reporting configuration list, and a measurement identity list, in order to perform the measurement procedure.

In 3GPP LTE, a BS may configure only one measurement object in UE with respect to a single frequency band. In accordance with Paragraph 5.5.4 of 3GPP TS 36.331 V8.5.0 (2009-03) "Evolved Universal Terrestrial Radio Access (E-UTRA) Radio Resource Control (RRC); Protocol specification (Release 8)," events that trigger measurement reports are defined in the following table.

TABLE 1

| Event | Reporting Condition |
| --- | --- |
| Event A1 | Serving becomes better than threshold |
| Event A2 | Serving becomes worse than threshold |
| Event A3 | Neighbour becomes offset better than Serving |
| Event A4 | Neighbour becomes better than threshold |
| Event A5 | Serving becomes worse than threshold1 and neighbor becomes better than threshold2 |
| Event B1 | Inter RAT neighbour becomes better than threshold |
| Event B2 | Serving becomes worse than threshold1 and inter RAT neighbor becomes better than threshold2 |

If the measurement result of the UE satisfies a set event, the UE sends a measurement report message to the base station.

One of the fields that is getting more and more important and detailed is reliable communication.

Reliable Communication refers to new communication services that are realized via error free transmission or service availability to implement mission critical services (MCS).

The necessity of reliable communication has been recognized since it is a part of M2M (machine-to-machine) communication that satisfies real-time requirements for traffic safety, traffic efficiency, E-health, efficient industrial communication, and so on.

Moreover, reliable communication needs to provide reliable connections for delay-sensitive applications such as traffic safety or special-purpose mission critical MTCs (machine-type communications).

In addition, the necessity of reliable communication is recognized for purposes like medical/emergency response, remote control, sensing, etc.

MCSs are expected to see significant improvements in terms of End-to-End Latency, Ubiquity, Security, Availability/Reliability, etc. compared to the conventional UMTS/LTE and LTE-A/Wi-Fi.

That is, the commercialized wireless technologies (including 3GPP LTE and LTE-A) proposed up to now fail to guarantee the adequate performance for providing various MCSs in the aspect of the Real-Time requirements and the Reliability requirements.

Furthermore, the metric of reliability may be an 'evaluation criterion for describing the quality of a radio link connection to satisfy a specific service level'.

Also, metrics for service availability may be called RLA (radio link availability), and the QoE (quality of experience) of the UE may be defined as RLA=Pr (RLQ>=QoE) when expressed in terms of link quality.

Here, RLQ is radio link quality, and QoE is QoE requirements from the perspective of link quality.

In addition, scenarios applicable to 5G mobile communication environments for MCSs may include the following services, for instance.

Transport of heavy loads by remotely controlling robot arms to realize Industrial Automation or remotely controlling Automated Guided Vehicles (AGVs).

Remote control of drones to provide physical distribution, remote healthcare services, and other various public services.

Safe exchange of information required between vehicles to provide autonomous vehicle service or safe delivery of safety signals indicating a hidden vehicle or forward collision, not detected by a vehicle sensor (e.g., camera, radar, etc.).

In the case that the radio link (serving link) quality of a serving base station is degraded to an extent of not proper for MCSs although another available alternative base station link is determined, the above-mentioned services should be provided continuously.

Accordingly, in the case that the degradation of the radio link quality of a serving base station is detected and it is determined that the radio link quality of the serving base station is not proper for providing MCSs, a method is required for activating another multilink quickly and for configuring an MCS bearer through the activated multilink.

Owing to the reasons, in order for reliable communication of 5G to be available, a terminal utilizes all radio links around and gives indication so as to maximize the radio link according to situations, and therefore, the decrease of radio link outage for providing MCS should be considered an essential element.

Moreover, in conventional LTE/LTE-A systems, a UE controls RLF based on a plurality of timers.

As mentioned previously, the UE is not able to recognize RLF before a specific timer (e.g., T310) expires, and the UE maintains an RRC connection or transitions to RRC Idle state depending on whether an RRC connection re-establishment procedure is successful or not before another timer (e.g., T311) expires.

Future 5G mobile communication should satisfy an error rate less than 10-6 and RLA requirements less than 10-6 in order to support MCS such as industrial automation, drone remote control, and autonomous vehicle driving.

As such, the goal of 5G is to build a high-reliability system that allows a UE to always get MCSs without feeling radio link outage.

However, the current LTE/LTE-A system is designed to process the recovery from the Radio Link Failure (RLF) very conservatively. Owing to this, it may be difficult to search other alternative available base stations quickly according to the channel situation of UE, and to secure alternative available base station for the activation of connection to the corresponding alternative base stations.

To solve this, methods have been proposed to preserve alternative link base stations that can quickly replace a serving base station when the channel status of a serving base station gets worse by allowing a UE to secure a plurality of base station links when connecting to a network.

That is, in a conventional method to be described below, a method will be described in which a UE configures multiple connections (or multi-links) to a plurality of base stations by transmitting to a base station an indicator indicating that the UE is an MCS-capable terminal when the UE connects to a network.

However, the conventional method has a problem that the UE sets up unnecessary multiple connections to a plurality of base stations unless the UE is provided with MCS all the time.

To solve this problem, the present specification provides a method for setting up or releasing multiple connections only when (1) an RRC-connected UE wants to receive MCSs if necessary.

Moreover, when the serving base station link quality of the UE becomes too deteriorated to be suitable for MCS, the continuity of MCS provision may be broken. Thus, (2) a method will be provided to activate an RRC connection (e.g., SRB) with a base station with the best radio link quality among secured alternative base stations to switch a connection to this base station and setting up an MCS bearer quickly through an alternative base station whose RRC connection is activated.

Furthermore, the present specification provides a method of periodically tracking uplink synchronization between a UE and alternative base stations, since TAs the UE has received from the alternative base stations may be out of sync due to the UE's movement or the like.

Described below are (1) a method for setting up multi-links (or multiple connections) based on a network indication, (2) the definition of a threshold of radio link quality $Q_{MCS}$ for the provision of mission critical services (MCS), and (3) an alternative link activation method and a method for setting up a bearer for MCS.

The terms used herein are defined as follows.

Multi-links refers to a plurality of radio links via which a UE has a connection with a plurality of base stations.

The multi-link may include a serving link and at least one alternative link.

The serving link denotes a radio link via which the UE has a connection with a serving base station, and the alternative link denotes a radio link having a connection with a base station other than the serving base station.

The meaning of the alternative link and its related operations will be described in greater details with reference to FIG. 18.

The serving link may be represented by a first radio link, and the alternative link may be represented by a second radio link.

Here, base stations other than the serving base station may be represented by alternative base stations, candidate (target) base stations, neighboring base stations, target base stations, and so on.

The serving base station refers to a base station by which UE is currently being serviced.

The alternative serving base station refers to a new serving base station that substitutes for the serving base station when the radio link quality of the serving base station gets worse (or deteriorates) which will be described later.

The alternative serving base station may be one of alternative base stations with which an SRB inactive alternative link is set up.

Additional alternative base stations represent alternative base stations that are additionally discovered by the UE, for which alternative links are additionally set up, apart from the alternative base stations for which an alternative link is set up.

A link connection refers to a radio connection with a base station, and may be represented by a radio link setup, radio link establishment, etc.

Also, multi-link connections (or setups) may be represented by multiple connections, alternative link connections, etc.

Hereinafter, multi-link setup and alternative link setup may be interchangeably used as necessary.

Definition of Alternative Links and Related Operations

FIG. 18 is a conceptual diagram of alternative links to which the methods proposed in the present invention may apply.

As defined previously, multiple connections or multi-links include a serving link and at least one alternative link.

The serving link refers to a radio link between UE and a serving base station, for which both SRB (signaling radio bearer) and DRB (data radio bearer) are generally active.

The alternative link represents a radio link between UE and at least one alternative base station, for which only inactive SRB is set up and no DRB is set up.

The alternative link is activated only by an activation indication from the serving, and may be an event-triggered dormant mode that has a different state from a general dormant mode.

That is, the alternative link that is connected in the SRB inactive state with an alternative base station maintains a sleep state in the alternative link continuously until an activation indication is made by UE.

Moreover, the UE may receive in advance information on the maximum number of alternative links that can connect to neighboring alternative base stations through a broadcast message such as SIB from the serving base station.

In addition, the UE may set up additional alternative links with neighboring alternative base stations that satisfy a specific condition $Q_{MCS}$ unless they are fewer than the maximum number of alternative links that can be set up by itself.

Method of Setting Up Multi-Link when Connecting to Network

First of all, prior to describing a method for setting up multi-links based on a network indication proposed in this specification, a method (hereinafter, 'conventional method') for setting up multi-links when UE connects to a network will be described briefly for better understanding.

The conventional method relates to a method in which the UE sets up an alternative link to a neighboring alternative base station when the UE connects to a network.

Here, the UE may connect to a network when the UE performs an initial network connection procedure or performs a network connection procedure when a mission critical service (hereinafter, "MCS") occurs in the idle state.

That is, the conventional method relates to a method in which UE sets up an alternative link with an alternative base station in order to support MCS when connecting to a network.

Moreover, the conventional method may apply to both (1) when no synchronization is required between the UE and the alternative base station, and (2) when synchronization is required between the UE and the alternative base station.

If no synchronization is required, this means (1) a 'small cell environment' in which the timing advance (TA) between the UE and the alternative base station (or small base station) is nearly 0, or (2) an environment in which a new-waveform-based asynchronous system is built.

If the UE has multi-links with a plurality of base stations, the UE has an active connection (active serving link) with the serving base station and an inactive connection (inactive alternative link) with an alternative base station.

The active serving link means that the UE sets up an active SRB (signaling radio bearer)/active DRB (data radio bearer) with the serving base station, and the inactive alternative link means that the UE sets up only an inactive SRB with an alternative base station.

That is, inactive SRB may represent a state in which UE has not set up DRB with an alternative base station.

Moreover, the serving base station sets up an S1-U Bearer with S-GW to set up E-RAB, which means that an EPS Bearer is set up along with an S5/S8 Bearer between S-GW and P-GW.

While an alternative base station having an alternative link set up with the UE sets up an S1-U Bearer with S-GW, it has no DRB set up with the UE, which means that no E-RAB is set up.

However, an S5/S8 Bearer may be likewise set up with P-GW.

That is, the UE sets up inactive SRB with at least one alternative base station in relation to MCS, but set up no DRB with it.

As described above, inactive SRB (or SRB inactive state) is different from a general dormant mode or domain state in LTE/LTE-A systems.

The SRB inactive state may be represented by SRB inactive mode.

That is, the general dormant mode refers to a mode that is used for power saving of an RRC-connected UE.

For example, when there is not data for UE to receive in DL, the UE enters the dormant mode and periodically sleeps and wakes up repetitively to reduce unnecessary power consumption of the UE.

On the contrary, the SRB inactive mode (or state) used in this specification refers to a state in which the UE continues to sleep if there is no SRB active indication.

The SRB inactive mode may be defined as a state that is activated by the UE's or serving base station's indication.

Accordingly, the SRB inactive mode may be represented by an event-triggered dormant mode.

As described previously, when multi-tier/multi-layer base stations exist within the UE's coverage (in-coverage situation), if the UE determines that the quality of the serving link is not enough to get MCS, the UE may be provided with MCS reliably and seamlessly by securing radio links with other base stations, i.e., alternative base stations, that ensure better radio link quality than the serving base station does.

Moreover, the following four modes may be considered depending on the active or inactive state of SRB and DRB of alternative links between UE and alternative base stations.

1. First mode: SRB Inactive and DRB Inactive
2. Second mode: SRB Inactive and DRB Active
3. Third mode: SRB Active and DRB Inactive
4. Fourth mode: SRB Active and DRB Active In the methods proposed in the present specification, the first mode and the fourth mode, that is, the two cases, will be taken into consideration.

Specifically, the first mode (SRB Inactive state/DRB Inactive state) is a state in which SRB is inactive and an EPS bearer that satisfies the QoS for MCS is not set up. In the first mode, no DRB is set up.

The fourth mode (SRB Active state/DRB Active state) is a state in which a deactivated RRC connection is activated by an activation indicator and RRC messages can be exchanged between the UE and the base station.

In the fourth mode, an EPS bearer that satisfies the QoS for MCS is set up, and DRB is set up.

The methods proposed in the present specification relate to (a) a method in which UE sets up an SRB inactive alternative link to an alternative base station by a network indication, and (2) a method for setting up an MCS bearer quickly by activating an SRB inactive alternative link to SRB active and DRB active.

That is, the methods proposed in this specification are to secure multi-links to alternative base stations other than the serving base station, in order to provide the UE with highly reliable mission critical services (MCS) continuously and seamlessly.

By this, upon detecting that the radio link quality of the serving base station is not enough to support MCS, the UE may activate an alternative link to an alternative base station with the best radio link quality among alternative base stations with which alternative links have been already set up (that is, the UE may switch the corresponding alternative base station to a new serving base station), and set up an MCS bearer quickly through the corresponding alternative base station, thereby ensuring the continuity of MCS provision to the UE.

Method for Setting Up Multi-Links Based on Network Indication

Based on what has been stated above, a method for setting up multi-links (or multiple connections) or alternative links based on a network indication, a method for activating alternative links, and a method for setting up an MCS bearer through an alternative base station will be described in detail with reference to the related drawings.

There are huge differences in their procedure for setting up multi-links and the resulting benefits between the aforementioned conventional method (a method for setting up multi-links upon a network connection) and the method proposed in this specification (a method for dynamically setting up multi-links upon occurrence of an MCS).

In the conventional method, when a UE connects to a network, the UE may synchronize with a serving base station and a plurality of alternative base stations, and receive C-RNTI from the plurality of alternative base stations, regardless of whether (1) there is a need to synchronize with the alternative base stations or (2) there is no need to synchronize with the alternative base stations.

However, an RRC connected UE has to unnecessarily maintain multi-links to a plurality of base stations, since it is not always provided with MCSs.

Accordingly, as long as the UE is provided with MCS, there is a need to define a method for dynamically setting up multiple connections (or multi-links) to a plurality of base stations by a network indication, etc. and releasing them.

Moreover, in order to ensure MCS continuity to the UE, there is a need to define a method for setting up an MCS more quickly by activating an alternative link to an alternative base station with good radio link quality for MCS and receiving a UL grant from the alternative base station with which the alternative link is activated.

Here, the UE may use RSRP (Reference Signal Received Power), RSRQ (Reference Signal Received Quality), RSSI (Received Signal Strength Indicator), SINR(Signal to Interference Plus Noise Ratio), etc. as means for measuring radio link quality.

Here, activating an alternative link to an alternative base station means changing an alternative link from SRB inactive state to SRB active state.

Moreover, setting up an MCS bearer may be construed as setting up a DRB for MCS between UE and a base station.

In addition, the UE may receive C-RNTI and TA (Timing Advance) from an alternative base station by an alternative link setup, but the TA and the alternative base station may be out of sync due to movement, etc. of the UE.

Accordingly, there is a need to define a method for the UE to periodically track the uplink synchronization with the alternative base station.

Furthermore, as a method for the UE to identify a decrease or deterioration of the radio link quality for MCS, there is a need to define a new radio link quality threshold related to MCS that satisfies reliability requirements specific to each MCS.

That is, the network transmits to the UE a radio link quality threshold newly defined for an MCS. Then, if the radio link quality of the serving base station is lower than the radio link quality threshold for providing the MCS, the UE activates the alternative link from SRB inactive state to SRB active state.

That is, a newly defined MCS radio link quality threshold may be used as a trigger condition for activating an alternative link.

Hereinafter, a method in which an RRC connected UE sets up an SRB inactive alternative link to an alternative base station based on a network indication, as proposed in the present specification, will be described in detail with reference to FIGS. 19 to 21.

An LTE(-A) system creates different EPS bearers depending on the quality of service (QoS).

That is, if there is DL traffic to send to a UE, the LTE(-A) system sets up a dedicated bearer for the UE through S-GW, MME, and a base station upon a request from PDN-GW.

If the UE has UL traffic—that is, a bearer resource modification request is made by the UE, a dedicated bearer setup procedure defined for the DL traffic may equally apply.

That is, when the UE requires a bearer setup for a specific service such as a mission critical service (MCS), if an MME receives a bearer setup request (through S-GW) upon a request from P-GW, the MME sends an E-RAB setup request message for bearer setup to the base station.

FIG. 19 is a flowchart illustrating an example of a method for setting up multi-links based on a network indication, as proposed in the present specification.

As discussed, setting up multi-links is a concept of setting up alternative links in addition to a serving link, which may have the same meaning as "alternative link setup" and construed or represented as such.

Moreover, the expression that a UE is connected to an alternative base station may be construed that an alternative link is set up between a UE and an alternative base station.

Referring to FIG. 19, a serving base station sends to a UE a broadcast message containing control information related to a mission critical service (MCS) (S1910).

The broadcast message may be an SIB (system information block), MIB (master information block), etc.

The control information related to the MCS may include a radio link quality degradation (RLQD) threshold, information on the maximum number of alternative links representing the maximum number of alternative links the UE can set up, and so on.

The RLQD threshold is the minimum value of radio link quality for receiving MCS, which refers to a reference value for determining whether MCS can be provided via a radio link or not due to deterioration in radio link (signal) quality.

Accordingly, if the radio link quality of the serving base station is lower than the RLQD threshold, the UE attempts to connect with another radio link.

Measurement of the radio link (signal) quality may be done using the aforementioned RSRP, RSRQ, RSSI, and SINR.

The information on the maximum number of alternative links is information indicating the maximum number of alternative links the UE can set up with alternative base stations for a specific service such as MCS.

Next, the UE measures the radio link quality of each alternative base station based on its own list of alternative base stations (or neighboring base stations and candidate base stations) and reports the measurement results to the serving base station (S1920).

Afterwards, an MME sends to the serving base station an E-RAB setup request message containing multi-link (or multi-connection) setup indication information (S1930).

By this, an MCS bearer setup procedure between the UE and the base stations (the serving base station and the alternative base stations) is performed (initiated).

The E-RAB setup request message may include E-RAB QoS parameters related to MCS, apart from the multi-connection setup indication information.

The multi-connection setup indication information refers to an indicator for indicating to set up multi-links (or alternative links) between the UE and at least one alternative base station.

One of the E-RAB QoS parameters related to the MCS may be an MCS QoS class identifier (QCI), and the E-RAB QoS parameters may be included in the E-RAB QoS Parameters IE (Information Elements).

That is, the serving base station may find out what the service related to the MCS bearer setup is about (or how the quality of this service) through the received E-RAB QoS parameters.

By this, the serving base station may set up a DRB (data radio bearer) with the UE for a service with a specific QoS.

To sum up, when providing MCS to a specific UE, a network entity (e.g., MME) notifies the serving base station through S1 signaling that an MCS bearer should be set up.

By this, the serving base station may set up a DRB for MCS with the UE and, if necessary, indicate to set up multi-links or alternative links for the UE.

Next, upon receiving the E-RAB setup request message, the serving base station may detect the load status of alternative base stations about which the UE periodically reports measurement results (through the step S1920), and request an alternative base station with good load status to set up an alternative link with the UE.

Here, the alternative base stations the serving base station possesses (or detects) may be limited to alternative base stations that satisfy the threshold of an MCS radio link (signal) required to be detected (or selected) as an alternative link for MCS.

The threshold of the MCS radio link quality (or reception signal quality) may be the aforementioned RLQD threshold.

That is, the UE selects alternative base stations with better radio link quality than the RLQD threshold obtained through the step S1910, and makes a list of candidate alternative base stations to set up alternative links and sends the list to the serving base station.

Referring to FIG. 19, a method for the UE to set up an alternative link to an alternative base station will be described in more detail.

The serving base station sends to alternative base stations (alternative base stations 1 and 2) a load query request message to detect the current load status of each alternative base station (S1940).

Afterwards, the alternative base stations (alternative base stations 1 and 2) send to the serving base station a load query response message as a response to the load query request (S1950).

The load query response message contains information on the current load status of alternative base stations.

The load status may be represented by high/medium/low.

Afterwards, the serving base station sends to the alternative base stations (alternative base stations 1 and 2) a multi-link connection request message for requesting a multi-link connection to the UE (S1960).

The expression 'multi-link connection request message' is only an example, and may also be called a multi-connection request message, an alternative link connection request message, an alternative link acquisition request message, etc.

The multi-link connection request message may contain a UE identifier (e.g., UE ID), UE context information, SRB (signaling radio bearer) deactivate indication information, etc.

The SRB deactivate indication information refers to an indicator for setting the SRB state of an alternative link to an alternative base station to inactive (or event-triggered Dormant mode).

Afterwards, the serving base station receives from the alternative base stations (alternative base stations 1 and 2) a multi-link connection response message as a response to the multi-link connection request message (S1970).

The multi-link connection response message may also be called a different term, as stated with respect to the multi-link connection request message.

Moreover, the multi-link connection response message contains information on alternative base stations.

That is, the multi-link connection response message may contain C-RNTI of an alternative base station, multi-link connection request result (success/failure) information, TA tracking indication information for acquiring synchronization between the UE and the alternative base station, TA tracking period information, and so on.

The TA tracking indication information and the TA tracking period information are information required for acquiring synchronization if the UE and the alternative base station are not in sync due to the movement of the UE, etc.

Afterwards, the serving base station sends to the UE an RRC connection reconfiguration message containing information received from the alternative base stations (alternative base stations 1 and 2) through the step S1970, in order to inform of information related to multi-link connection setup, that is, information that alternative links to the alternative base stations (alternative base stations 1 and 2) are set up (S1980).

The RRC connection reconfiguration message may further contain radio bearer QoS for indicating that MCS bearer is set up, session management request information, EPS RB ID information, and so on.

Afterwards, the UE sends to the serving base station an RRC connection reconfiguration complete message indicating completion of the multi-link connection setup for the alternative base stations (alternative base stations 1 and 2) (S1990).

As shown in FIG. 19, the serving base station may continuously maintain the list of alternative base stations and update this list as necessary.

As discussed above, FIG. 19 illustrates an example of a method for setting up an alternative link between a UE and an alternative base station by a network (MME) indication when there is no need for synchronization between the UE and the alternative base station.

Next, a method for setting up a multi-link connection based on a network indication, as proposed in the present specification when there is a need for synchronization between a UE and alternative base stations will be described with reference to FIG. 20.

FIG. 20 is a flowchart illustrating another example of a method for setting up multi-links based on a network indication as proposed in the present specification.

The steps S2001 to S2008 are identical to the step S1910 to S1980 of FIG. 19, so FIG. 19 can be used as a reference for detailed descriptions thereof, and only the differences between FIG. 19 and FIG. 20 will be described in details.

That is, FIG. 20 is about a method for setting up an alternative link when a UE needs to synchronize with an alternative base station. The UE has a dedicated random access preamble allocated by each alternative base station through an RRC connection reconfiguration message, and acquires C-RNTI through a random access procedure with each alternative base station.

That is, the UE receives C-RNTI and TA (timing advance) information from the alternative base stations, but the UE and the alternative base stations may be out of sync due to the movement of the UE, etc. To this end, uplink synchronization may be periodically tracked.

To this end, each alternative base station may include its C-RNTI, periodical TA tracking indication information, and period information for the TA tracking in a random access response and send it to the UE.

Accordingly, through the random access response, the UE may synchronize with an alternative base stations in uplink by periodically sending a dedicated random access preamble to the alternative base station according to a TA tracking period indicated by the alternative base station.

This will be described in greater details with reference to FIG. 20.

Specifically, after the step S2007, the serving base station sends an RRC connection reconfiguration message containing a dedicated random access preamble allocated by each alternative base station (alternative base stations 1 and 2) (S2008).

Afterwards, the UE performs an RACH procedure for uplink synchronization with each alternative base station (alternative base stations 1 and 2) (S2009 and S2010).

That is, the UE sends the dedicated random access preamble allocated by each alternative base station (alternative base stations 1 and 2) through PRACH (S2009).

The UE receives from each alternative base station a random access response containing C-RNTI, periodic TA tracking indication information, and TA tracking period information that are related to each alternative base station (S2010).

Afterwards, the UE sends to the serving base station an RRC connection reconfiguration complete message indicating completion of the RRC connection reconfiguration (S2011).

FIG. 21 is a flowchart illustrating another example of a method for setting up multi-links based on a network indication as proposed in the present specification.

That is, FIG. 21 is another example of FIG. 19, and TA tracking information (TA tracking indication information and TA tracking period information) may be included in an RRC connection reconfiguration message and sent to a UE.

As illustrated in FIGS. 19 to 21, the UE sets up multi-links with base stations—that is, sets up active SRB and active DRB with a serving base station and sets up inactive SRB with an alternative base station.

Method for Releasing Multi-Links (Multi-Connections)

Hereinafter, a method for a UE to release multi-links (or multi-connections) to alternative base stations will be described in details with reference to FIGS. 22 and 223.

In FIGS. 22 and 23, if a network does not provide MCS to the UE anymore (it wants to release a dedicated bearer for MCS set up for the UE), an MME may send a request specifying this to a serving base station or the serving base station may send it to the MME, thereby releasing the alternative links for MCS between the UE and the alternative base stations.

Methods for releasing multi-links may be divided into (1) a method in which a serving base station notifies a UE of the release of the multi-links (FIGS. 22) and (2) a method in which alternative base stations to be released notify the UE about this (FIG. 23).

FIG. 22 is a flowchart illustrating an example of a method for releasing multi-links as proposed in the present specification.

First of all, a method for a serving base station to notify a UE of the release of multi-links for MCS will be described with reference to FIG. 22.

Moreover, in FIG. 22, an E-RAB release command or E-RAB release indication specifying that an MCS dedicated bearer should be released may be classified as follows, depending on who sends it.

(1) The MME sends an E-RAB release command message to the serving base station ((a) of FIG. 22)

(2) The serving base station sends to the MME an E-RAB release indication specifying that the dedicated bearer for MCS shall be released ((b) of FIG. 22)

In FIG. 22, it is assumed that an MCS bearer is set up between the UE and base stations (the serving base station and the alternative base stations)

As shown in (a) of FIG. 22, the serving base station receives from the MME an E-RAN release command message indicating the release of the MCS bearer (S2211).

Alternatively, as shown in (b) of FIG. 22, the serving base station sends to the MME an E-RAB release indication message for releasing the MCS bearer (S2212).

The E-RAB release command message or E-RAB release indication message contains multilink-connection release indication information and E-RAB release list information for MCS.

Afterwards, the serving base station sends a multi-link release request message for making a multi-link release request to each of the alternative base stations (alternative base stations 1 and 2) from which the alternative links are to be released (S2220).

The multi-link release request message contains UE ID, etc.

Afterwards, the serving base station receives a multi-link release response message from the alternative base stations (alternative base stations 1 and 2) as a response to the multi-link release request message (S2230).

Afterwards, the serving base station sends to the UE the results of the release of the alternative links from the alternative base stations (alternative base stations 1 and 2) through an RRC connection reconfiguration message (S2240).

The RRC connection reconfiguration message may contain C-RNTI and identifier information of the alternative base stations.

Afterwards, the UE sends to the serving base station an RRC connection reconfiguration complete message as a response to the RRC connection reconfiguration message (S2250).

Through this procedure, the MCS bearer set up between the UE and the base stations is released.

Particularly, the SRB inactive alternative link connections set up for MCS between the UE and the base stations are released.

That is, the UE maintains the active SRB/DRB set up with the serving base station (but releases the dedicated bearer for MCS), and releases the inactive SRBs set up with the alternative base stations.

FIG. 23 is a flowchart illustrating another example of a method for releasing multi-links as proposed in the present specification, Unlike FIG. 22, FIG. 23 illustrates a method in which alternative base stations notify a UE that multi-links or alternative links are released.

The steps S2311 to S2320 are identical to the step S2211 to S2220 of FIG. 22, so FIG. 22 can be used as a reference for detailed descriptions thereof, and only the differences between FIG. 22 and FIG. 23 will be described in details.

Referring to FIG. 23, the serving base station sends a multi-link release request message in the step S2320 to alternative base stations (alternative base stations 1 and 2) from which alternative links are to be released, and the serving base station then sends to the UE an RRC connection reconfiguration message indicating that the bearer for MCS is released (S2330).

Afterwards, upon receiving the multi-link release request from the serving base station, the alternative base stations (alternative base stations 1 and 2) send to the UE an RRC connection release message for indicating that the MCS bearers (i.e., alternative links) are released from the alternative base stations (S2340).

Afterwards, the alternative base stations may notify the serving base station of the results of the release of the alternative links from the UE, and this procedure may apply optionally.

That is, the results of the release of the alternative links sent to the serving base station by the alternative base stations are responses to the multi-link release request, and may be performed through a multi-link release response message.

MCS-Related Radio Link (Signal) Quality Threshold ($Q_{MCS}$)

Next, a method for determining whether downlink radio link quality is proper or not in order for a UE to be provided with MCS reliably and seamlessly will be described.

As illustrated in FIGS. 19 to 21, the UE may synchronize with a serving base station and an alternative base station, regardless of whether there is a need to synchronize with the alternative base station or not, and receives and acquires C-RNTI from the alternative base station.

Moreover, the UE may set up an MCS bearer more quickly by activating an alternative link to the best alternative base station according to changes in the radio link quality of the serving base station and/or alternative base station and receiving a UL grant through the activated alternative link to the alternative base station.

Here, the activation of an alternative link means changing an alternative link from SRB inactive state to SRB active state as illustrated in FIGS. 19 to 21, which may be triggered by the serving base station or the UE.

Next, in order for the UE to monitor downlink radio link quality, a brief description will be given of '$Q_{out}$', a reference (value) by which downlink radio link quality cannot be measured reliably. The $Q_{out}$ is defined as follows.

"The threshold $Q_{out}$ is defined as the level at which the downlink radio link cannot be reliably received and shall correspond to 10% block error rate of a hypothetical PDCCH transmission taking into account the PCFICH errors with transmission parameters specified in Table 2."

The following Table 2 is a table showing an example of PDCCH/PCHICH transmission parameters for out-of-sync.

TABLE 2

| Attribute | Value |
| --- | --- |
| DCI format | 1A |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4; Bandwidth = 1.4 MHz<br>8; Bandwidth ≥ 3 MHz |
| Ratio of PDCCH RE energy to average RS RE energy | 4 dB; when single antenna port is used for cell-specific reference signal transmission by the PCell or PSCell.<br>1 dB: when two or four antenna ports are used for cell-specific reference signal transmission by the PCell or PSCell. |
| Ratio of PCFICH RE energy to average RS RE energy | 4 dB; when single antenna port is used for cell-specific reference signal transmission by the PCell or PSCell.<br>1 dB: when two or four antenna ports are used for cell-specific reference signal transmission by the PCell or PSCell. |

Note 1:
DCI format 1A is defined in clause 5.3.3.1.3 in TS 36.212 [21].
Note 2:
A hypothetical PCFICH transmission corresponding to the number of control symbols shall be assumed.

As discussed above, the commercial wireless technologies (including 3GPP LTE and LTE-A) proposed until the present may not ensure sufficient performance to provide a variety of mission critical services (MCSs) in terms of reliability requirements.

The reason of this is because the reliability requirement, i.e., reliability criterion, for providing MCSs, is as high as 99.999%.

That is, the threshold $Q_{out}$ defined with respect to a BER (block error rate) of 10% cannot satisfy the reliability requirement for providing MCSs.

Accordingly, in the present specification, $Q_{MCS}$ is newly defined as a threshold of the reliability requirement (or criterion) for providing MCSs.

The newly defined $Q_{MCS}$ refers to the smallest, reference, or threshold value of the radio link quality for supporting MCSs.

Thus, if the radio link quality does not satisfy $Q_{MCS}$, the alternative link to the best alternative base station is activated.

That is, the $Q_{MCS}$ may be used as a trigger condition for setting up an MCS bearer quickly.

The $Q_{MCS}$ may be determined according to channel code type, codeword length, data size, MCS (modulation and coding scheme) level, etc.

(1) The $Q_{MCS}$ defined with respect to the minimum reliability requirement (e.g., BER of 1%) that can be defined commonly for all MCSs may be sent to the UE through SIB, etc., or (2) the UE may be notified of the radio link quality threshold $Q_{MCS}$ for MCSs through an RRC connection reconfiguration message indicating to the UE that the MCS dedicated bearer mentioned in FIGS. 19 to 21 is set up.

Therefore, the UE may receive $Q_{MCS}$ through (1) or (2), and if the downlink radio link quality is lowered below the threshold of $Q_{MCS}$, may provide reliable and seamless MCSs by activating the alternative link to the best alternative base station and setting up a bearer with the alternative base station with which the alternative link is activated.

Method for Activating Alternative Link and Setting Up Bearer Through Alternative Base Station Described below are a method for activating an alternative link to a specific alternative base station when the radio link (serving link) quality between a UE and a serving base station is deteriorated and a method for setting up an MCS bearer through the specific alternative base station.

That is, a description will be given of a method for replacing a serving base station with a specific alternative base station and setting up an SRB inactive alternative link to an additional alternative base station as a substitute for the serving base station when the radio link (serving link) quality between a UE and the serving base station is too deteriorated to support MCS.

FIGS. 24 to 26 illustrates methods for activating an alternative link to the best alternative base station among alternative base stations having SRB inactive alternative links with a UE and setting up an MCS bearer quickly through the alternative base station with which the alternative link is activated, when the radio link (serving link) (signal) quality of the serving base station is not suitable for supporting a specific MCS while the UE is connected to a network through a serving base station and has set up an EPS bearer for MCS.

Here, a state in which an EPS bearer for MCS is set up refers to a state in which a UE secures the DRB ID of a radio section and the EPS Bearer ID of a network section.

Moreover, if the radio link (signal) quality of the serving base station gets too worse to be suitable for a specific MCS, this means that the radio link quality of the serving base station is lowered below $Q_{MCS}$.

FIG. 24 is a flowchart illustrating an example of a method for activating an alternative link to an alternative base station and setting up an MCS bearer when the radio link quality of a serving base station is deteriorated, as proposed in the present specification.

FIG. 24 depicts a method that is applicable when there is no need for synchronization between a UE and an alternative base station.

Here, if there is no need for synchronization between a UE and an alternative base station, this may mean a small cell environment or an environment in which a new waveform-based asynchronous system is built.

That is, FIG. 24 depicts a method in which, if a UE detects that the radio link quality of a serving base station is too deteriorated to support MCS (that is, the serving link quality is lowered below the threshold $Q_{MCS}$), the UE notifies the serving base station about this and the serving base station determines or selects an alternative serving base station as a substitute for itself among alternative base stations.

A more detailed description will be made with reference to FIG. 24.

First of all, it is assumed that the UE has set up multi-link connections to the serving base station and alternative base stations through the method of FIGS. 19 to 21. That is, it is assumed that SRB inactive alternative links are setup between the UE and alternative base stations.

The UE periodically measures the DL signal quality of the serving base station and alternative base stations (S2401).

As for the DL signal measurement period for the UE, DL signal quality measurement period information may be specified in an RRC connection reconfiguration message the serving base station sends to the UE when setting up an alternative link to an alternative base station.

Afterwards, if the radio link signal quality of the serving base station is lowered below the defined threshold $Q_{MCS}$, that is, lower than $Q_{MCS}$, the UE notifies the serving base station about this (S2402). That is, multi-link activation is triggered.

Specifically, the UE checks whether the radio link quality of the serving base station is enough to provide MCS based on the threshold of the MCS-related radio link quality acquired through the RRC connection reconfiguration message or the like.

If the check result shows that the radio link quality of the serving base station is less than $Q_{MCS}$, the UE sends radio link quality deterioration (RLQD) indication information to the serving base station (S2402).

Here, if the UE additionally discovers or identifies alternative base stations having better signal quality than the radio link signal quality of the serving base station, it sends to the serving base station information about the additional alternative base stations, along with the RLQD indication information.

Here, the serving base station has information about the UE such as the DRB ID, E-RAB ID, E-RAB QoS parameters, EPS Bearer ID, S-GW TEID, etc.

Moreover, the serving base station has a list of alternative base stations with which the UE has set up SRB inactive alternative links and another list of alternative base stations detected by the UE (with which no alternative links are set up in SRB inactive state).

The alternative base stations in the another list refer to alternative base stations with which the UE has set up additional alternative links, which will be denoted below by "additional alternative base stations".

Afterwards, the serving base station sends a link activation request message to all the alternative base stations (candidate base stations 1, 2, and 3) present in their own list of alternative base stations, in order to select the best alternative base station among the alternative base stations with which the UE has set up alternative links (S2403).

The link activation request message may contain UE identity (UE ID) information and load query request indication information for requesting the load status of the alternative base station.

Afterwards, the serving base station receives a link activation response message as a response to the link activation request message from the corresponding alternative base stations (candidate base stations 1, 2, and 3) (S2404).

The link activation response message may contain UE ID, information indicating the load status of the alternative base station, etc.

The load status of each alternative base station may be represented by high/medium/low.

Afterwards, the serving base station determines or selects the best alternative base station (alternative base station 2) to replace the serving base station, based on the received link activation response message.

Afterwards, the serving base station sends to the determined alternative base station (alternative base station 2) a link activation confirmation message containing information required for activating an alternative link connection to the UE and setting up a bearer quickly (S2405).

Specifically, the serving base station includes information about an UE identifier (UE ID), an indicator for indicating SRB activation with the corresponding UE, E-RAB parameters for the UE, UE capability, S-GW TEID, a list of alternative link base stations with which the UE has set up SRB inactive alternative links, and a list of additional alternative base stations reported by the UE (whose connections are not established in SRB inactive state), and sends this information to an alternative base station (e.g., alternative base station 2) whose SRB connection with the UE is to be activated.

As defined previously, the alternative base station whose SRB connection with the UE is to be activated will be simply referred to as an "alternative serving base station".

Simultaneously with the transmission of the link activation confirmation message, the serving base station stops DL data transmission to the UE, and forwards DL data of the UE to the alternative serving base station (candidate base station 2).

In this case, UL data is continuously sent to the serving base station since the UE has not receive any indication about base station switching from the serving base station.

Afterwards, upon receiving the link activation confirmation message, the alternative serving base station (candidate alternative base station 2) sends to the UE an RRC connection activation message containing serving eNB switch indication information for indicating to switch the serving base station and information related to radio resource configuration for the UE by the alternative serving alternative base station (S2406).

The information related to radio resource configuration may include information about radio resource configuration including DRB ID.

Afterwards, the UE sends an RRC connection activation complete message to the alternative serving base station (alternative base station 2) which will perform the role of a new serving base station (S2407).

At the same time, the UE sends UL data to the alternative serving base station and stops UL data transmission to the previous serving base station.

Afterwards, the alternative serving base station (alternative base station 2) sends to the serving base station a link activation complete message indicating that the SRB activation and bearer setup with the corresponding UE are complete (S2408).

The link activation complete message may contain the UE identifier (UE ID).

Afterwards, upon receiving the link activation complete message, the serving base station deletes the UE's context and sends SN (status number) Status Transfer to the alternative serving base station whose SRB with the UE is activated (S2409).

The SN Status Transfer may include SN (status number) information about DL data the serving base station has received until sending a link activation confirmation message to the alternative serving base station and SN information about UL data the serving base station has received until receiving a link activation complete message from the alternative serving base station.

Afterwards, the alternative serving base station sends to an additional alternative base station (alternative base station 3) a multi-link connection request message requesting to set up an additional alternative link in SRB inactive state for the UE, based on information about the additional alternative base station (alternative base station 3) of the UE received from the serving base station (S2410).

Afterwards, the alternative serving base station receives a multi-link connection response message from the additional alternative base station (alternative base station 3) as a response to the multi-link connection request message (S2411).

A detailed description of the steps S2410 and S2411 will be made with reference to FIGS. 19 to 21.

Here, the multi-link connection response message sent from the additional alternative base station contains C-RNTI the additional alternative base station allocates to the UE.

Afterwards, the alternative serving base station sends C-RNTI, which is received from the additional alternative base station with which the additional alternative link in SRB inactive is set up, to the UE through an RRC connection reconfiguration message (S2412).

FIG. 25 is a flowchart illustrating another example of a method for activating an alternative link to an alternative base station and setting up an MCS bearer when the radio link quality of a serving base station is deteriorated, as proposed in the present specification.

Unlike FIG. 24, FIG. 25 depicts a method that is applicable when there is no need for synchronization between a UE and an additional alternative base station.

Here, the additional alternative base station refers to an alternative base station the UE additionally discovers with which the UE has set up an additional alternative link, apart from alternative base stations with which alternative links have been already set up as in FIGS. 19 to 21. In FIG. 25, the alternative base station 3 refers to the additional alternative base station.

That is, the additional alternative base station refers to an alternative base station that satisfies $Q_{MCS}$ and is additionally detected by the UE (with which no SRB inactive alternative link has not been set up yet).

FIG. 25 likewise depicts a method in which, when a UE detects a deterioration in the radio link signal quality for MCS of a serving base station, the UE notifies the serving base station about this and the serving base station determines or selects an alternative serving base station to replace itself.

The steps S2501 to S2511 are identical to the step S2401 to S2411 of FIG. 24, so FIG. 24 can be used as a reference for detailed descriptions thereof, and only the differences between FIG. 24 and FIG. 25 will be described in details.

The alternative serving base station requests the additional alternative base station to set up an additional alternative link in SRB inactive state for the UE based on information about the additional alternative base station for the UE received from the serving base station, and receives a response to this request.

A multi-link connection response message sent from the additional alternative base station contains a dedicated random access preamble the additional alternative base station allocates to the UE.

Referring to FIG. 25, the alternative serving base station (alternative base station 2) sends an RRC connection reconfiguration message to the UE (S2512).

The RRC connection reconfiguration message contains a dedicated random access preamble that is allocated to the UE by the additional alternative base station (alternative base station 3).

That is, the alternative serving base station transmits to the UE a dedicated random access preamble, which is received from the additional alternative base station with which an additional SRB inactive alternative link is set up, through the RRC connection reconfiguration message.

Afterwards, the UE sends the received dedicated random access preamble to the additional alternative base station (alternative base station 3) through PRACH (S2513).

Afterwards, the UE is allocated the C-RNTI of the additional alternative base station through a random access response as a response to the dedicated random access preamble from the additional alternative base station (S2514).

FIG. 26 is a flowchart illustrating another example of a method for activating an alternative link to an alternative base station and setting up an MCS bearer when the radio link quality of a serving base station is deteriorated, as proposed in the present specification.

FIG. 26 depicts an example of a method that is applicable when there is no need for synchronization between a UE and an additional alternative base station.

However, when there is no need for synchronization, this may apply equally to FIG. 24.

In FIG. 26, unlike FIG. 25, an alternative serving base station (alternative base station 2) to be switched to a serving base station sends a link activation complete message to the serving base station immediately after receiving a link activation confirmation message from the serving base station.

This can eliminate or reduce the time during which DL data and/or UL data transmission from the UE is interrupted.

The steps S2601 to S2605 are identical to the step S2510 to S2505 of FIG. 25, so FIG. 25 can be used as a reference for detailed descriptions thereof, and only the differences between FIG. 25 and FIG. 26 will be described in details.

In FIG. 26, unlike FIG. 24 and FIG. 25, the serving base station does not stop DL data transmission from the UE after sending (S2605) a link activation confirmation message to the alternative serving base station (alternative base station 2).

That is, the serving base station sends the link activation confirmation message to the alternative serving base station, then receives a link activation complete message from the alternative serving base station, and then forwards buffered DL data from the UE to the alternative serving base station until an RRC connection activation message is sent to the UE.

In this case, the UE continues to send UL data to the serving base station since it has not received any indication related to the switching of the serving base station.

Here, upon receiving the link activation confirmation message, the alternative serving base station sends to the serving base station a link activation complete message to the serving base station containing the UE identifier and the alternative base station's radio resource configuration information for the UE (S2606).

The link activation complete message contains information on radio resource configuration including DRB ID.

That is, the difference between FIG. 26 and FIGS. 24 and 25 is that the alternative serving base station sends the link activation complete message to the serving base station immediately after receiving the link activation confirmation message from the serving base station.

This can reduce the delay of DL data to be transmitted to the UE and UL data transmission received from the UE.

A detailed description of this will be made below.

Afterwards, upon receiving the link activation complete message, the serving base station sends to the UE an RRC connection activation message containing the identifier (ID) of a new serving base station (alternative base station 2) and an indicator indicating (or specifying) the switching of the serving base station.

Simultaneously with the transmission of the RRC connection activation message, the serving base station forwards the UE's buffered UL data and DL data to the alternative serving base station (candidate base station 2) (S2607).

Afterwards, the UE releases the connection to the serving base station, and sends an RRC connection activation complete message to the alternative serving base station (candidate base station 2) (S2608).

The RRC connection activation complete message contains SN (status number) status information on UL and DL data sent and received between the serving base station and the UE until the UE receives an RRC connection activation message from the serving base station.

Afterwards, the UE sends UL Data to the alternative serving base station.

Afterwards, the alternative serving base station sends to the additional alternative base station a multi-link connection request message requesting to set up an additional SRB inactive alternative link for the UE, based on information on the additional alternative base station for the UE received from the serving base station in the step S2605 (S2609), and receives a multi-link connection response from the additional alternative base station as a response (S2610).

That is, the alternative serving base station performs the steps S2510 and S2511 with the additional alternative base station.

The multi-link connection response message contains a dedicated random access preamble that is allocated to the UE by the additional alternative base station (alternative base station 3).

Afterwards, the alternative serving base station transmits to the UE a dedicated random access preamble, which is received from the alternative base stations (additional alternative base stations) with which additional SRB inactive alternative links are set up, through the RRC connection reconfiguration message (S2611).

Afterwards, the UE sends the received dedicated random access preamble to an additional alternative base station through PRACH (S2612), and is allocated C-RNTI through a random access response as a response (S2613).

The difference between the method of FIG. 26 and those of FIGS. 24 and 25 may be summed up as follows.

In FIGS. 24 and 25, there is a period in which the UE's DL data transmission may be interrupted until an alternative serving base station receives an RRC activation complete message after the serving base station sends a link activation confirmation message to the alternative serving base station.

Moreover, there may be a period in which the UE's UL data transmission is interrupted until the alternative serving base station receives SN status transfer from the serving base station after the UE sends an RRC activation complete message to the alternative serving base station.

On the contrary, in FIG. 26, the period in which the UE's DL data transmission is interrupted may be eliminated since the serving base station is able to send DL data to the UE after the serving base station receives a link activation complete message from the alternative serving base station.

Alternatively, the serving base station may reduce the period in which DL data transmission is interrupted, by stopping the DL data transmission while sending an RRC connection activation message to the UE.

Likewise, the period in which the UE's UL data transmission is interrupted may be reduced since the UE stops the UE's UL data transmission only until the UE sends an RRC connection activation complete message to the alternative serving base station after receiving an RRC connection activation message from the serving base station.

The following Table 3 shows a comparison of the methods proposed in the present specification with a handover procedure defined in a conventional LTE-(A) system.

Particularly, the following Table 3 shows the results of a comparison made from the perspective of U_plane interruption time which is described to be a problem with a handover procedure in the LTE(-A) system.

TABLE 3

|   | Components | Time (ms) | Components | Time (ms) |
|---|---|---|---|---|
| 1 | Radio Synchronisation to the target cell | 1 | Radio Synchronisation to the target cell | 1 |
| 2 | Average delay due to RACH scheduling period (1 ms periodicity) | 0.5 | Average delay due to RACH scheduling period (1 ms periodicity) | 0.5 |
| 3 | RACH Preamble | 1 | RACH Preamble | 1 |
| 4-5 | Preamble detection and transmission of RA response (Time between the end RACH transmission and UE's reception of scheduling grant and timing adjustment) | 5 | Preamble detection and transmission of RA response (Time between the end RACH transmission and UE's reception of scheduling grant and timing adjustment) | 5 |
| 6 | Decoding of scheduling grant and timing alignment | 2 | Decoding of scheduling grant and timing alignment | 2 |
| 7 | Transmission of DL Data | 1 | Transmission of DL Data | 1 |
| Total |  | 10.5 |  | 1 |

Referring to Table 3, the DL/UL data transmission interruption time in the conventional HO scheme may be 24.5 ms.

On the contrary, in FIGS. 24 and 25, the DL data transmission interruption time may be 20 ms, and the UL data transmission interruption time may be 24 ms.

Also, in FIG. 26, the calculated DL data transmission interruption time may be 1 ms or up to 11 ms, and the calculated UL data transmission interruption time may be 11 ms.

That is, in the methods (FIGS. 24 to 26) proposed in the present specification, the UE activates an alternative link to an alternative base station with which an SRB inactive alternative link has been already set up, and then sends an RRC connection activation message to the UE.

Accordingly, the UE may be provided with seamless MCS as its alternative link to the alternative serving base station is activated (SRB activation, DRB setup) while maintaining a connection to the serving base station.

Therefore, as shown in Table 3, the interruption time caused by the handover in the conventional LTE(-A) system can be reduced.

That is, the serving base station stops the UE's DL data transmission once it receives a link activation complete message from an alternative serving base station, whereas the UE activates an alternative link to the alternative serving base station simultaneously while sending UL data to the serving base station.

After this procedure, the UE releases the connection to the serving base station, and therefore it is possible to reduce the time it takes for the UE to disconnect from the serving base station and switches to the alternative serving base station (target base station) in a conventional handover procedure.

FIG. 27 is a block diagram illustrating a wireless device by which the methods proposed in the specification may be implemented.

Here, the wireless device may be a network entity, a base station, a terminal, etc., and the base station includes both a macro base station and a small base station.

As shown in FIG. 27, a base station 20 and a UE 10 each includes a communication unit (a transmission/reception unit and an RF unit) 2713 and 2723, a processor 2711 and 2721, and a memory 2712 and 2722.

Besides, the base station and the UE each may further include an input unit and an output unit.

The communication unit 2713 and 2723, the processor 2711 and 2721, the input unit, the output unit, and the memory 2712 and 2722 are functionally connected to perform the methods proposed in the present specification.

When receiving information produced by a physical layer (PHY) protocol, the communication unit (or the transmission/reception unit or the RF unit) 2713 and 2723 moves the received information to an RF (radio frequency) spectrum, performs filtering and amplification on the information, and sends it by an antenna. Furthermore, the communication unit moves an RF signal, received from the antenna, to a band that may be processed in the PHY protocol and performs filtering on the RF signal.

Furthermore, the communication unit may have a switch function for switching between such transmission and reception functions.

The processor 2711 and 2721 implements the functions, processes and/or methods proposed in this specification. The layers of a radio interface protocol may be implemented by the processor.

The processor may be represented as a control part, a controller, control unit, or a computer.

The memory 2712 and 2722 is connected to the processor and stores protocols or parameters for performing the methods proposed in this specification.

The processor 2711 and 2721 may include application-specific integrated circuits (ASICs), other chipsets, logic circuits and/or data processing devices. The memory may include read-only memory (ROM), random access memory (RAM), flash memory, a memory card, a storage medium and/or other storage devices. The communication unit may include baseband circuits for processing radio signals. When an embodiment is implemented in software, the method may be implemented as a module (process or function) for performing the functions.

The module may be stored in the memory and may be executed by the processor. The memory may be placed inside or outside the processor and may be connected to the processor by well-known means.

The output unit (or display unit) is controlled by the processor and outputs information output by the processor along with a key entry signal generated from a key input unit and various information signals from the processor.

Furthermore, the drawings have been divided and described for convenience of description, but the embodiments described with reference to the drawings may be merged to implement a new embodiment(s). Furthermore, the scope of the present invention also includes designing a computer-readable recording medium in which a program for executing the aforementioned embodiments has been written according to the needs of those skilled in the art.

The methods proposed in this specification are not limited and applied to the configurations and methods of the aforementioned embodiments, but some or all of the embodiments may be selectively combined and configured so that the embodiments are modified in various ways.

In this specification, the methods proposed in the present specification may be implemented in a recording medium, readable by a processor included in a network device, in the form of code readable by the processor. The processor-readable recording medium includes all types of recording devices in which data readable by a processor is stored. The processor-readable recording medium may include ROM, RAM, CD-ROM, magnetic tapes, floppy disks, and optical data storages, for example. Furthermore, the processor-readable recording medium may be implemented in the form of carrier waves, such as transmission over the Internet.

Furthermore, the processor-readable recording medium may be distributed to computer systems connected over a network, and processor-readable codes may be stored in the processor-readable recording medium and executed in a distributed manner.

INDUSTRIAL APPLICABILITY

The intent of the present specification is to use a method for setting up a bearer in a wireless communication system.

The invention claimed is:

1. A method for setting up a bearer in a wireless communication system, the method performed by a first base station, comprising:
    receiving, from a network entity, a first message requesting to set up an E-UTRAN radio access bearer (E-RAB) for a mission critical service (MCS),
    the first message containing first indication information for indicating to set up an alternative link between a terminal and at least one second base station;
    transmitting, to the at least one second base station, a second message requesting to set up an alternative link with the terminal, based on the received first message; and
    receiving, from the at least one second base station, a response message to the second message,
    the second message containing second indication information for indicating to set the SRB (Signaling Radio Bearer) state of the alternative link to inactive.

2. The method of claim 1, further comprising:
    transmitting, to the terminal, a broadcast message containing control information related to the MCS.

3. The method of claim 2, wherein the control information comprises at least either information indicating a radio link quality threshold for supporting the MCS or information on the maximum number of alternative links indicating the maximum number of alternative links that can be set up.

4. The method of claim 1, wherein the first message further comprises a QoS class identifier (QCI) indicating the MCS.

5. The method of claim 1, further comprising:
    transmitting, to the at least one second base station, a fourth message for requesting the load status of the at least one second base station; and
    receiving, from the at least one second base station, a fifth message containing current load status information.

6. The method of claim 5, wherein the current load status information is either high, medium, or low.

7. The method of claim 1, further comprising:
receiving the C-RNTI (cell-radio network temporary identifier) of the second base station and timing advance (TA) information related to uplink synchronization between the terminal and the second base station.

8. The method of claim 7, wherein the TA information comprises at least either TA tracking indication information or TA tracking period information.

9. The method of claim 1, further comprising:
transmitting, to the terminal, an RRC connection reconfiguration message for indicating that an alternative link to the at least one second base station has been set up; and
receiving, from the terminal, an RRC connection reconfiguration complete message as a response to the RRC connection reconfiguration message.

10. The method of claim 9, wherein the RRC connection reconfiguration message further contains dedicated random access preamble information the at least one second base station allocates to the terminal.

11. The method of claim 10, further comprising:
transmitting, to the at least one second base station, the allocated dedicated random access preamble through a PRACH (physical random access channel); and
receiving, from the at least one second base station, a random access response to the PRACH.

12. The method of claim 7, wherein the C-RNTI and the TA information are included in either the response message, the RRC connection reconfiguration message, or the random access response.

13. The method of claim 3, wherein the at least one second base station satisfies a radio link quality condition for supporting the MCS.

14. The method of claim 1, further comprising:
performing an E-RAB connection release procedure for the terminal with the network entity.

15. The method of claim 14, wherein third indication information indicating the release of an alternative link between the terminal and the at least one second base station is transmitted and received through the E-RAB connection release procedure.

16. The method of claim 15, further comprising:
transmitting, to the at least one second base station, a sixth message requesting the release of an alternative link with the terminal; and
performing an RRC connection reconfiguration procedure with the terminal.

17. The method of claim 1, further comprising:
receiving, from the terminal, fourth indication information indicating a deterioration in the quality of a serving link for the MCS;
transmitting, to the at least one second base station, a seventh message for requesting to activate the alternative link to the at least one second base station based on the fourth indication information;
receiving a response message to the seventh message from the at least one second base station;
determining a second base station to substitute for the first base station based on the received response message; and
receiving, from the determined second base station, a ninth message indicating that the activation of the alternative link is complete.

18. The method of claim 17, further comprising:
receiving, from the terminal, a list of additional second base stations discovered by the terminal.

19. The method of claim 17, wherein the ninth message is received from the at least one second base station immediately after the eighth message is transmitted to the determined second base station.

20. A first base station for setting up a bearer in a wireless communication system, the first base station comprising:
a communication unit that transmits and receives radio signals to and from the outside; and
a processor functionally attached to the communication unit,
wherein the processor is configured to:
receive, from a network entity, a first message requesting to set up an E-UTRAN radio access bearer (E-RAB) for a mission critical service (MCS);
to transmit, to at least one second base station, a second message requesting to set up an alternative link with a terminal, based on the received first message; and
to receive, from the at least one second base station, a response message to the second message,
the first message containing first indication information for indicating to set up an alternative link between the terminal and the at least one second base station, and
the second message containing second indication information for indicating to set the SRB (Signaling Radio Bearer) state of the alternative link to inactive.

* * * * *